US005651995A

United States Patent [19]
Oyama et al.

[11] Patent Number: 5,651,995
[45] Date of Patent: Jul. 29, 1997

[54] HIGHLY SATURATED NITRILE RUBBER, PROCESS FOR PRODUCING SAME, VULCANIZABLE RUBBER COMPOSITION, AQUEOUS EMULSION AND ADHESIVE COMPOSITION

[75] Inventors: Motofumi Oyama, Yokosuka; Yoshiaki Aimura, Kawasaki; Kazuyoshi Nakajima, Tokyo; Osamu Mori, Kamakura; Mitsugu Ishihara, Kawasaki, all of Japan

[73] Assignee: Nippon Zeon Co., Ltd., Tokyo, Japan

[21] Appl. No.: 476,329

[22] Filed: Jun. 7, 1995

[30] Foreign Application Priority Data

Sep. 30, 1994 [JP] Japan .................. 6-261366
Sep. 30, 1994 [JP] Japan .................. 6-261367
Sep. 30, 1994 [JP] Japan .................. 6-261369

[51] Int. Cl.$^6$ ........................ C08F 8/02
[52] U.S. Cl. .............. 524/565; 524/566; 525/135; 525/324.3; 525/338; 525/339; 525/343
[58] Field of Search ............... 524/565, 566; 525/135, 329.3, 338, 339, 343; 526/222

[56] References Cited

U.S. PATENT DOCUMENTS

| | | |
|---|---|---|
| 3,898,208 | 8/1975 | Krause . |
| 4,251,409 | 2/1981 | Neubert . |
| 4,350,796 | 9/1982 | Oyama et al. . |
| 4,404,329 | 9/1983 | Maeda et al. . |
| 4,405,756 | 9/1983 | Oyama et al. . |
| 4,464,515 | 8/1984 | Rempel et al. . |
| 4,469,849 | 9/1984 | Murrer et al. . |
| 4,746,707 | 5/1988 | Fiedler et al. . |
| 4,978,771 | 12/1990 | Fiedler et al. . |
| 5,017,639 | 5/1991 | Mori et al. . |
| 5,159,010 | 10/1992 | Mori et al. . |
| 5,164,457 | 11/1992 | Kubo et al. . |
| 5,208,296 | 5/1993 | Rempel et al. . |
| 5,210,151 | 5/1993 | Rempel et al. . |
| 5,272,202 | 12/1993 | Kubo et al. . |

FOREIGN PATENT DOCUMENTS

| | | |
|---|---|---|
| 0240697 | 10/1987 | European Pat. Off. . |
| 0366377 | 5/1990 | European Pat. Off. . |
| 0 386 499 | 9/1990 | European Pat. Off. . |
| 0 479 083 A1 | 4/1992 | European Pat. Off. . |
| 1045402 | 2/1989 | Japan . |
| 1045403 | 2/1989 | Japan . |
| 1045404 | 2/1989 | Japan . |
| 1045405 | 2/1989 | Japan . |
| A-6-9822 | 1/1994 | Japan . |
| WOA 94 22924 | 10/1994 | WIPO . |

OTHER PUBLICATIONS

J. Soc. Rub. Ind., Jp, vol. 59, No. 4, pp. 210–214, 1986.
N. Asada et al., Rub. Chem. & Tech., Composition Distribution of Acrylonitrile–Butadiene . . . , vol. 63, No. 2, pp. 181–190.

*Primary Examiner*—Bernard Lipman
*Attorney, Agent, or Firm*—Birch, Stewart, Kolasch & Birch, LLP

[57] ABSTRACT

A nitrile group-containing highly saturated copolymer rubber which is a product obtained by hydrogenating the conjugated diene portion of an unsaturated nitrile-conjugated diene copolymer. The highly saturated copolymer rubber has an alkylthio group having 12 to 16 carbon atoms, which include at least three tertiary carbon atoms, and having a sulfur atom which is directly bound to at least one of the tertiary carbon atom, and the highly saturated copolymer rubber further has a Mooney viscosity of 15 to 200 and an iodine value not larger than 80. The highly saturated copolymer rubber is produced copolymerizing an unsaturated nitrile, a conjugated diene and an optional copolymerizable monomer by using as a molecular weight modifier an alkylthiol compound having 12 to 16 carbon atoms, which include at least three tertiary carbon atoms, and having a sulfur atom which is directly bound to at least one of the tertiary carbon atoms; and then, hydrogenating the thus-obtained copolymer. The highly saturated copolymer rubber exhibits a high-rate vulcanizability when vulcanized with a sulfur-containing vulcanizer.

33 Claims, 2 Drawing Sheets

1

HIGHLY SATURATED NITRILE RUBBER, PROCESS FOR PRODUCING SAME, VULCANIZABLE RUBBER COMPOSITION, AQUEOUS EMULSION AND ADHESIVE COMPOSITION

BACKGROUND OF THE INVENTION (1) Field of the Invention

This invention relates to (i) a nitrile group-containing highly saturated copolymer rubber, (ii) a process for producing the nitrile group-containing highly saturated copolymer rubber, (iii) a vulcanizable rubber composition comprising the nitrile group-containing highly saturated copolymer rubber, (iv) an aqueous emulsion of the nitrile group-containing highly saturated copolymer rubber, and (v) an adhesive composition comprising the nitrile group-containing highly saturated copolymer rubber.

The nitrile group-containing highly saturated copolymer rubber of the invention is characterized as exhibiting good high-rate vulcanizability and a vulcanizate made therefrom has high mechanical strength and low compression set. The adhesive composition comprising an aqueous emulsion containing the nitrile group-containing highly saturated copolymer rubber is especially useful for bonding under vulcanizing conditions a highly saturated nitrile rubber to a fibrous material.

(2) Description of the Related Art

In recent years, a nitrile group-containing highly saturated copolymer rubber (a typical example of which is a hydrogenation product of an acrylonitrile-butadiene copolymer) has attracted much attention as a rubbery material having good heat resistance, oil resistance and weather resistance. Many nitrile group-containing highly saturated copolymer rubbers have heretofore been proposed. For example, a hydrogenated acrylonitrile-conjugated diene copolymer rubber which is a hydrogenated product of an acrylonitrile-conjugated diene copolymer and has good ozone resistance and gasoline resistance is described in Japanese Unexamined Patent publication No. 54-132647.

A nitrile group-containing highly saturated copolymer rubber has a low degree of unsaturation, and therefore, is difficult to vulcanize and a vulcanizate thereof has a poor mechanical strength and a large compression set.

Pot injection molding of an acrylonitrile-conjugated diene copolymer rubber, a high fluidity and a high cross-linking efficiency at a high-temperature and short-time vulcanization are generally required. However, in general, the higher the vulcanization temperature, the lower the degree of crosslinking efficiency. Therefore injection-molded articles have poor tensile stress and impact resilience as compared with compression molded articles (for example, see Journal of Society of Rubber Industry, Japan, vol. 59, No. 4, p. 214-215, 1986). This tendency is conspicuous in a hydrogenated acrylonitrile-conjugated diene copolymer rubber.

To impart a high-rate vulcanizability to a hydrogenated acrylonitrile-conjugated diene copolymer rubber, many proposals have been made, which include incorporation of vulcanization promotors such as a tellurium dithiocarbamate compound (Japanese Unexamined Patent Publication No. 6-9822), a thiuram promotor plus a partial ester salt of a di- and/or tricarboxylic acid (Japanese Unexamined Patent Publication No. 4-264145) and a thiuram promotor plus N-trichloromethylsulphenylbenzenesulfanilide (Japanese Unexamined Patent Publication NO. 2-248442). However, the high-rate vulcanizability attained by these proposals is not on a high level and in some cases physical properties of the vulcanizate are deteriorated.

Further, contamination of a mold is conspicuous in the injection molding of a hydrogenated acrylonitrile-conjugated diene copolymer rubber wherein vulcanization is carried out at a high temperature. That is, where the molding is repeated, staining materials are gradually deposited on the mold with the result of contamination of moldings and Spoiling of the surface appearance. Therefore the mold must be cleaned at regular intervals, but the cleaning is time-consuming and costly and leads to reduction in productivity.

To avoid the contamination of a mold, proposals have been made wherein talc, sodium thiosulfate, carbon wax or silicone oil is incorporated in the copolymer rubber. However, it is difficult to avoid the mold contamination to any appreciable extent where the vulcanization is effected at a high temperature and a high rate as in injection molding.

With regard to the application of a highly saturated nitrile rubber for an adhesive, the present inventors proposed an adhesive composition comprising an aqueous emulsion of a highly saturated nitrile rubber and a resorcinol-formaldehyde resin, which is used for bonding a fibrous material with an adherend rubber, i.e., a highly saturated nitrile rubber similar to the rubber in the adhesive composition (Japanese Unexamined Patent Publication No. 63-248879 and 3-167239). Both the nitrile rubber in the adhesive composition and the nitrile rubber as the adherend rubber are highly saturated, i.e., have a low unsaturation. Thus, it is difficult to effect the vulcanization at a high efficiency and attain a high bonding strength.

SUMMARY OF THE INVENTION

In view of the foregoing, an object of the present invention is to provide a nitrile group-containing highly saturated copolymer which has good weather resistance, oil resistance and heat resistance, that are generally possessed by conventional nitrile group-containing highly saturated copolymers; which can provide a vulcanizable rubber composition capable of being vulcanized at a high rate and suitable for injection molding, and capable of providing a vulcanizate having a good mechanical strength, exhibiting a reduced compression set and having no problem of mold contamination.

Another Object of the present invention is to provide a process for making the above-mentioned nitrile group-containing highly saturated copolymer with a high productivity.

Still another object of the present invention is to provide a vulcanizable rubber composition having the above-mentioned advantages.

A further object of the present invention is to provide an adhesive composition which has good weather resistance, oil resistance and heat resistance, that are generally possessed by conventional nitrile group-containing highly saturated copolymers; which is suitable for bonding a fibrous material with a rubber composition having a sulfur-containing vulcanizer, under vulcanizing conditions; and which is capable of providing a vulcanizate having a good mechanical strength and exhibiting a reduced compression set.

A further object of the present invention is to provide an aqueous emulsion of a nitrile group-containing highly saturated copolymer, which is useful for the above-mentioned adhesive composition, and further for film and binder having good oil resistance, heat resistance and weather resistance.

in one aspect of the present invention, there is provided a nitrile group-containing highly saturated copolymer rubber, which is a product obtained by hydrogenating the conjugated diene portion of an unsaturated nitrile-conjugated diene copolymer; said highly saturated copolymer rubber having an alkylthio group having 12 to 16 carbon atoms, which include at least three tertiary carbon atoms, and having a sulfur atom which is directly bound to at least one of the tertiary carbon atoms; and said highly saturated copolymer rubber further having a Mooney viscosity of 15 to 200 and an iodine value not larger than 80.

In another object of the present invention, there is provided a process for producing the above-mentioned nitrile group-containing highly saturated copolymer rubber which comprises the steps of:

Copolymerizing an unsaturated nitrile with a conjugated diene in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms; and then hydrogenating the conjugated diene portion of the thus-obtained unsaturated nitrile-conjugated diene copolymer.

In still another aspect of the present invention, there is provided a vulcanizable rubber composition comprising 100 parts by weight of the above-mentioned nitrile group-containing highly saturated copolymer rubber and 0.01 to 10 parts by weight of a sulfur-containing vulcanizer.

In a further aspect of the present invention, there is provided an aqueous emulsion of the above-mentioned nitrile group-containing highly saturated copolymer rubber.

In a further aspect of the present invention, there is provided an adhesive composition comprising an aqueous emulsion of the above-mentioned nitrile group-containing highly saturated copolymer rubber and a resorcinol-formaldehyde resin.

DESCRIPTION OF THE PREFERRED EMBODIMENTS

Nitrile Group-Containing Highly Saturated Copolymer Rubber

Figure 1:
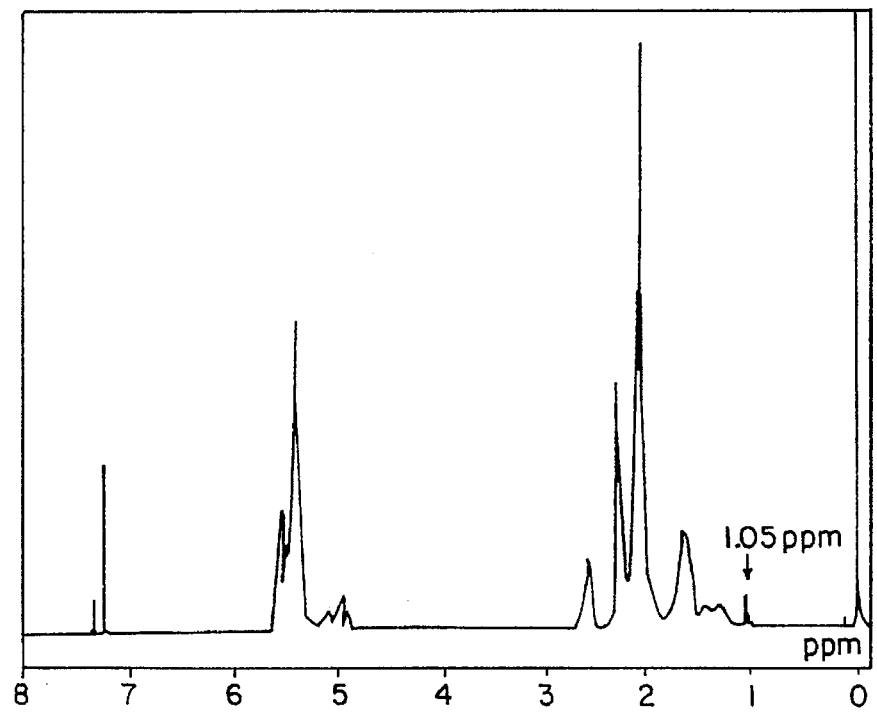
FIG. 1 is a chart of $^1$H-NMR determination of an unsaturated nitrile-conjugated diene copolymer I prepared in Example 1, hereinafter described.

The nitrile group-containing highly saturated copolymer rubber of the present invention is a product obtained by hydrogenating the conjugated diene portion of an unsaturated nitrile-conjugated diene copolymer having an alkylthio group having 12 to 16 carbon atoms, which include at least three tertiary carbon atoms, and having a sulfur atom which is directly bound to at least one of the tertiary carbon atoms. The nitrile group-containing highly saturated copolymer rubber has a Mooney viscosity of 15 to 200, preferably 30 to 100 and an iodine value not larger than 80, preferably not larger than 40. If the Mooney viscosity of the highly saturated copolymer rubber is smaller than 15, a satisfactory bonding strength cannot be obtained and the strength of vulcanizate is not high. If the Mooney viscosity exceeds 200, the moldability is reduced. There is no lower limit of the iodine value, but preferably the iodine value is at least 1 because, if the iodine value is too low, the vulcanization with sulfur becomes difficult.

The unsaturated nitrile-conjugated diene copolymer used for the preparation of the nitrile group-containing highly saturated copolymer rubber of the present invention preferably contains 3 to 20% by weight of a fraction having a number average molecular weight (Mn) not larger than 35,000. If the fraction having an Mn not larger than 35,000 is too large, mechanical strength is reduced. Where the content of the fraction having an Mn not larger than 35,000 is 3 to 20% by weight, processability can be improved with the maintenance of high strength.

The ratio (Mw/Mn) of the weight average molecular weight (Mw) to the number average molecular weight (Mn) of the unsaturated nitrile-conjugated diene copolymer is usually in the range of 2.3 to 5.5, preferably 2.7 to 4. If the Mw/Mn ratio is too large, the processability is low even though the content of the fraction having an Mn not larger than 35,000 is adequate.

The unsaturated nitrile-conjugated diene copolymer preferably contains 10 to 60% by weight of bound unsaturated nitrile units. More preferable content is 20 to 50% by weight. The breadth (ΔAn) of compositional distribution of the unsaturated nitrile is usually not larger than 35, preferably in the range of 3 to 20, more preferably 5 to 15 If the distribution breadth is too large, the balance between the oil resistance and the cola resistance is lost.

The unsaturated nitrile-conjugated diene copolymer is preferably substantially free from halogen. The term "substantially free from halogen" used herein means that the content of halogens in the copolymer is smaller than about 3 ppm. The copolymer substantially free from halogen is beneficial, for example, in that a problem of metal corrosion does not arise when the copolymer as an adhesive is placed in contact with a metal.

As specific examples of the unsaturated nitrile, there can be mentioned acrylonitrile, methacrylonitrile and α-chloroacrylonitrile. As specific examples of the conjugated diene there can be mentioned 1,3-butadiene, 2,3-dimethylbutadiene, isoprene and 1,3-pentadiene.

Provided that the object of the present invention is not injured, part of the unsaturated nitrile and the conjugated can be substituted by copolymerizable monomers. As specific examples of the copolymerizable monomer, there can be mentioned vinyl monomers such as styrene, α-methylstyrene and vinylpyridine; non-conjugated diene monomers such as vinylnorbornene, dicyclopentadiene and 1,4-hexadiene; alkyl acrylates and alkyl methacrylates having 1 to 18 carbon atoms in the alkyl group, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate; alkoxyalkyl acrylates having 2 to 12 carbon atoms in the alkoxyalkyl group, such as methoxymethyl acrylate, methoxyethyl acrylate, ethoxyethyl acrylate, butoxyethyl acrylate, ethoxypropyl acrylate, methoxyethoxyethyl acrylate and ethoxybutoxyethyl acrylate; cyanoalkyl acrylates having 2 to 12 carbon atoms in the cyanoalkyl group, such as α- and β-cyanoethyl acrylate, α-, β- and γ-cyanopropyl acrylate, cyanobutyl acrylate, cyano-hexyl acrylate and cyanooctyl acrylate; hydroxyalkyl acrylates such as 2-hydroxyethyl acrylate and hydroxypropyl acrylate; monoalkyl and dialkyl esters of unsaturated dicarboxylic acids such as monoethyl maleate, dimethyl maleate, dimethyl fumarate, diethyl fumarate, di-n-butyl fumarate, di-2-ethylhexyl fumarate, dimethyl itaconate, di-n-butyl itaconate and di-2-ethylhexyl itaconate substituted-alkyl esters of unsaturated carboxylic acids such as ethyl-aminomethyl acrylate, diethylaminoethyl acrylate, 3-(di-ethylamino)-2-hydroxypropyl acrylate and 2,3-bis(difluoro-amino) propyl acrylate; fluoroalkyl acrylates and methacaprylates such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl acrylate, trifluoroethyl methacrylate, tetrafluoropropyl methacrylate, octafluoropentyl methacrylate, dodecafluoroheptyl methacrylate, pentadecafluorooctyl methacrylate and hexadecafluorononyl methacrylate; fluoro-substituted benzyl acrylate and methacrylate such as fluorobenzyl acrylate, fluorobenzyl methacrylate and difluorobenzyl methacrylate; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; fluorine-containing vinyl monomers such as o- and p-trifluoromethylstyrene, vinyl pentafluorobenzoate, difluoroethylene and tetrafluoroethylene; and polyethylene glycol acrylate, polyethylene glycol methacrylate, polypropylene glycol acrylate, polypropylene glycol methacrylate, epoxy acrylate, epoxy methacrylate, urethane acrylate and urethane methacrylate. The amount of these copolymerizable monomers is not particularly limited, but is usually not larger than 80% by weight based on the total weight of monomers. Especially when high oil resistance and heat resistance are required, the amount of the copolymerizable monomer is not larger than 10% by weight.

Where an unsaturated carboxylic acid ester monomer or a combination thereof with a fluorine-containing vinyl monomer is copolymerized together with the unsaturated nitrile and the conjugated diene, cold resistance of the nitrile group-containing highly saturated copolymer rubber can be improved without deterioration of the ozone resistance and heat resistance. Especially unsaturated dicarboxylic acid dialkyl esters are preferable for this purpose. The amount of the unsaturated carboxylic acid ester or a combination thereof with a fluorine-containing vinyl monomer is 1 to 80% by weight, preferably 15 to 60% by weight, more preferably 20 to 40% by weight, based on the total weight of the monomers.

Of the unsaturated nitrile-conjugated diene copolymers used for the preparation of the nitrile group-containing highly saturated copolymer rubber, an acrylonitrile-butadiene copolymer (hereinafter abbreviated to "NBR") having a bound acrylonitrile content of 10 to 60% by weight, preferably 20 to 50% by weight, is advantageous. Commercially available acrylonitrile-butadiene copolymers having a wide variety of bound acrylonitrile contents can be used and the most adequate bound acrylonitrile content should be chosen depending upon the particular properties desired.

As the alkylthio group having 12 to 16 carbon atoms, which include at least three tertiary carbon atoms, and having a sulfur atom which is directly bound to at least one of the tertiary carbon atoms, there can be mentioned a 1,1-di(2,2-dimethylpropyl)-1-ethylthio group and a 1,1-di(2,2-dimethylpropyl)-1-(2,2,4,4-tetramethylpentyl)-1-ethylthio group. These alkylthio groups may be contained either alone or in combination in one molecule. Of these, a 1,1-di(2,2-dimethylpropyl)-1-ethylthio group is preferable.

The amount of the alkylthio group in the unsaturated nitrile-conjugated diene copolymer is usually at least 0.03 mole, preferably at least 0.07 mole, more preferably at least 0.09 mole, per 100 moles of the total monomer units in the copolymer. The upper limit of the alkylthio group content is usually 0.3 mole per 100 moles of the total monomer units in the copolymer. If the amount of the alkylthio group is too small, when the nitrile group-containing highly saturated copolymer rubber is vulcanized at a high temperature for a short time, e.g., at the step of injection molding, a high crosslinking efficiency cannot be obtained and thus the tensile stress and impact resilience cannot be improved. Namely the intended high rate of vulcanization cannot be effected. As an increase in the amount of the alkylthio group, the scorch time ($T_s$) is markedly shortened and the contamination of a mold is mitigated, and thus, the productivity in injection molding is enhanced. Especially when the content of the alkylthio group is at least 0.09 mole, the crosslinking efficiency is markedly improved, and the maximum torque in a vulcanization curve as obtained by measurement using an oscillating disc rheometer is drastically increased.

The unsaturated nitrile-conjugated diene copolymer is produced by a process wherein an unsaturated nitrile monomer and a conjugated diene monomer are copolymerized in the presence of a free-radical initiator by using as a molecular weight modifier an alkylthiol compound having 12 to 16 carbon atoms, which include at least three tertiary carbon atoms, and having a sulfur atom which is directly bound to at least one of the tertiary carbon atoms.

The free radical initiator used is not particularly limited. As examples of the free radical initiator, there can be mentioned organic peroxides, redox polymerization initiators, azo compounds and persulfates. These polymerization initiators are usually used in an amount of 0.005 to 3 parts by weight per 100 parts by weight of the monomers. The polymerization temperature is preferably in the range of 0° to 100° C.

As specific examples of the alkylthiol compound used as a molecular weight modifier for the production of the unsaturated nitrile-Conjugated diene copolymer, there can be mentioned 2,2',4,6,6'-pentamethylheptane-4-thiol and 2,2',4,6,6',8,8'-heptamethylnonane-4-thiol. Of these, 2,2',4, 6,6'-pentamethylheptane-4-thiol is preferable. A nitrile group-containing highly saturated copolymer rubber made from the unsaturated nitrile-conjugated diene copolymer made by using this alkylthiol compound exhibits excellent efficiency in high-rate vulcanization.

The alkylthiol compound as a molecular weight modifier can be used either alone or in combination. If desired, the alkylthiol compound can be used in combination with another molecular weight modifier which is conventionally used in a radical polymerization. In this case the alkylthiol compound should be used in an amount of at least 50% by weight, preferably at least 80% by weight, and more preferably at least 95% by weight, based on the total weight of the molecular weight modifiers.

As the molecular weight modifier which may be used in combination with the above-mentioned alkylthio compound, there can be mentioned, for example, alkylthiol compounds such as 2,4,4-trimethylpentane-2-thiol, dodecane-12-thiol, 2,2,6,6-tetramethylheptane-4-methanethiol and 2,4,6-trimethylnonane-4-thiol; xanthogendisulfides such as dimethyl xanthogendisulfide, diethyl xanthogendisulfide and diisopropyl xanthogendisulfide; thiuram disulfides such as tetramethylthiuram disulfide, tetramethylthiuram disulfide and tetrabutylthiuram disulfide; halogenated hydrocarbons such as carbon tetrachloride and ethylene bromide; hydrocarbons such as pentaphenylethane; and acrolein, methacrolein, allyl alcohol, 2-ethylhexyl thioglycolate, terpinolene, α-terpinene, γ-terpinene, dipentene, α-methylstyrene dimer (which preferably contains at least 50% by weight of 2,4-diphenyl-4-methyl-1-pentene), 2,5-dihydrofuran, 3,6-dihydro-2H-pin, phthalan, 1,2-butadiene and 1,4-hexadiene.

The amount of the molecular weight modifier used for radical polymerization is usually 0.05 to 3 parts by weight, preferably 0.1 to 1 part by weight, based on 100 parts by weight of the monomer mixture for copolymerization. This amount is advantageous for desirably controlling the molecular weight of the copolymer.

By adding the molecular weight modifier in lots in the course of polymerization, a copolymer containing 3 to 20% by weight of a low-molecular weight fraction having a number average molecular weight (Mn) smaller than 35,000 can be obtained. This low-molecular weight copolymer has a good processability. In general, it is preferable that 10 to 95% by weight of the molecular weight modifier is incorporated in a monomer mixture before the commencement of polymerization and, when the conversion reaches 20 to 70%, the remainder is added to the polymerization mixture. The number of divided lots can be appropriately determined according to the need.

Instead of the addition of the molecular weight modifier in lots in the course of polymerization, two or more of polymers having different molecular weights can be mixed together, which are separately produced by using different amounts of the molecular weight modifier.

By using the above-mentioned alkylthiol molecular weight modifier, the conversion in radical polymerization can be enhanced to at least 75%, preferably at least 80%. Thus the nitrile rubber can be produced at a high productivity.

In a radical polymerization for the production of an unsaturated nitrile-conjugated diene copolymer, a branch-forming reaction or gelation generally becomes marked with an increase of the polymerization conversion. Where the resulting nitrile rubber is vulcanized, a high vulcanization efficiency cannot be obtained and the vulcanizate has poor physical properties such as tensile stress and impact resilience. t-Dodecyl mercaptan which is conventionally used as a molecular weight modifier in a radical polymerization for nitrile rubbers is a mixture of alkylthiol compound isomers having 9 to 16 carbon atoms. Where this mixture is used as a molecular weight modifier, the resulting nitrile rubbers are difficult to vulcanize at a high rate when they are subjected to a high-temperature and short-time vulcanization, for example, when injection-molded.

In contrast, in the process for producing the unsaturated nitrile-conjugated diene copolymer using the above-mentioned alkylthiol molecular weight modifier, even when the polymerization conversion is high, e.g., 80% or higher, the resulting nitrile rubber can be vulcanized at a high rate, and thus, the maximum torque in a vulcanization curve as obtained by measurement using an oscillating disc rheometer is high.

The entire amount of the monomers can be charged at once in a reactor before the commencement of polymerization. Alternatively, 30 to 90% by weight of the monomers can be charged before the commencement of polymerization and, when the polymerization Conversion reaches 20 to 70% by weight, the remainder monomers are added to a polymerization mixture. The nitrile rubber made by this divided monomer addition method is characterized as having good and balanced oil resistance and cold resistance.

The kind and amount of monomers added in lots can be appropriately varied depending upon the intended content of bound unsaturated nitrile and the breadth (ΔAN) of compositional distribution of unsaturated nitrile. For example, where a bound nitrile content of smaller than 37% is intended, part of the unsaturated nitrile is usually added to the reaction mixture during polymerization. Where a bound nitrile content of at least 37% is intended, part of the conjugated diene is usually added to the reaction mixture during polymerization. The number of monomer addition can be appropriately determined according to the need.

The procedure by which the polymerization is effected is not particularly limited, and an appropriate procedure can be chosen from bulk polymerization, solution polymerization, suspension polymerization and emulsion polymerization. Of these, emulsion polymerization is preferable.

Where the unsaturated nitrile-conjugated diene copolymer is produced by an emulsion polymerization procedure, if a carboxylic acid type emulsifier is used, a problem of mold contamination does not arise at a high-temperature short-time vulcanization such as injection molding.

The carboxylic acid type emulsifier used includes, for example, fatty acid soap and rosin soap. As specific examples of the carboxylic acid type emulsifier, there can be mentioned fatty acid soap such as a sodium salt or a potassium salt of long-chain aliphatic carboxylic acids having 12 to 18 carbon atoms, for example, lauric acid, myristic acid, palmitic acid, stearic acid, oleic acid and mixtures thereof; and rosin soap such as a sodium salt or a potassium salt of a disproportionated or hydrogenated product of natural rosin such as gum rosin, wood rosin or tall oil rosin the natural rosin contains as main ingredients abietic acid, levopimaric acid, palustric acid, dehydroabietic acid, tetrahydroabietic acid and neoabietic acid. The amount of the emulsifier is not particularly limited, but is usually in the range of 0.05 to 10 parts by weight, preferably 0.5 to 3 parts by weight, per 100 parts by weight of the monomers.

The emulsion polymerization for the unsaturated nitrile-conjugated diene copolymer can be carried out by a conventional procedure, and when the predetermined conversion is reached, polymerization is terminated by adding a short-stopper such as hydroxylamine or Sodium carbamate. Unreacted monomers are removed, for example, by heating or steam distillation, and then, a coagulant is added in an emulsion polymerization, and which include an inorganic coagulant, a high-polymer coagulant or a heat-sensitive coagulant.

However, it is preferable that a nonionic surface active agent is incorporated in the copolymer latex as prepared in the above-mentioned manner, and then, the copolymer latex is introduced in a coagulating bath having a metal salt dissolved therein, and is heated whereby the copolymer latex is coagulated. By adopting this coagulating method, crumbs which have appropriate size and porosity and are capable of being easily dried. Further, by the addition of a nonionic surface active agent, the amount of a metal salt for coagulation can be reduced.

As specific examples of the nonionic surface active agent incorporated in the copolymer latex in the above-mentioned coagulating method, there can be mentioned an adduct of an alkylene oxide with an alkylphenol-formaldehyde condensate (for example, an oxyethylene-oxypropylene co-addition product), a polyoxyethylene alkyl ether, a polyoxyethylene alkyl-aryl ether, a polyoxyethylene fatty acid ester, a polyoxyethylene sorbitan fatty acid ester, polyoxyethyleneoxypropylene block copolymer, an alkylsulfinyl alcohol and a fatty acid monoglyceride. These nonionic surface active agents can be used either alone or in combination.

Of these nonionic surface active agents, an oxyethyleneoxypropylene co-addition product of an alkylphenolformaldehyde condensate is preferable. This co-addition product exhibits a good heat-sensitive gel effect. The co-addition product preferably has a cloud point of 10 to 100° C., more preferably 20° to 70° C. If the cloud point is too low, the handling property is not satisfactory. If the cloud point is too high, the heatsensitive gel effect becomes poor.

The amount of the nonionic surface active agent is preferably 0.01 to 5 parts by weight, more preferably 0.05 to 2 parts by weight, based on 100 parts by weight of the copolymer. When the amount is too small, the above-mentioned benefits cannot be obtained. Even when the amount exceeds 5% by weight, there is no substantial increase in the above-mentioned benefits.

As the metal salt to be incorporated in the coagulating bath, calcium chloride, sodium chloride and metal sulfates are usually used. Especially metal sulfates do not contain halogens and thus result in a nitrile group-containing highly saturated copolymer rubber which does not cause a problem of metal corrosion. As specific examples of the metal sulfates, there can be mentioned aluminum sulfate, magnesium sulfate and sodium sulfate. Of these, aluminum sulfate and magnesium sulfate are preferable.

The amount of the metal salt is preferably in the range of 0.5 to 50 parts by weight, more preferably 1 to 30 parts by weight, based on 100 parts by weight of the copolymer. If the amount of the metal is too small, coagulation is insufficient and undesirably large crumbs are formed. If the amount of the metal salt is too large, the rate of coagulation varies depending upon the particular metal salt and the crumbs have a poor porosity.

When the coagulating bath having the copolymer latex introduced therein is heated to the cloud point of the nonionic surface active agent or higher, the copolymer latex coagulates. The nonionic surface active agent used preferably has a cloud point of 10° to 100° C. If the cloud point is too low, cooling is required for keeping the latex-incorporated coagulating bath below the cloud point. If the cloud point is too high, the latex-incorporated coagulating bath must be heated to a high temperature for coagulation.

The coagulated copolymer is recovered, washed with water and dried to give an unsaturated nitrile-conjugated diene copolymer, followed by hydrogenation to produce the nitrile group-containing highly saturated copolymer rubber.

The method by which the unsaturated nitrile-conjugated diene copolymer rubber is hydrogenated is not particularly limited, and a conventional method using a catalyst can be adopted. As specific examples of the catalyst for hydrogenation, there can be mentioned palladium/silica and a palladium complex (Japanese Unexamined Patent Publication [JP-A] No. 3-252405), and rhodium compounds and ruthenium compounds (JP-A 62-125858, 62-42937, 1-45402, 1-45403, 1-45404 and 1-45405). The amount of the catalyst is not particularly limited, but is usually 5 to 10,000 ppm based on the weight of copolymer.

Aqueous Emulsion of Nitrile Group-Containing Highly Saturated Copolymer Rubber

The nitrile group-containing highly saturated copolymer rubber of the invention can be used in the form of an aqueous emulsion. The aqueous emulsion usually contains 5 to 80% by weight, based on the weight of the emulsion, of the copolymer rubber in the form of finely divided particles having an average particle diameter of 0.005 to 0.5 μm.

The method for preparing the aqueous emulsion is not particularly limited. Usually a method of phase reversal of emulsion and a method of hydrogenating directly a latex of the unsaturated nitrile-conjugated diene copolymer are adopted.

The method of the preparation of the aqueous emulsion will be described in detail.

In the method of phase reversal of emulsion, a solution of the nitrile group-containing highly saturated copolymer rubber is mixed with an aqueous solution of an emulsifier, the mixture is thoroughly stirred whereby the highly saturated copolymer rubber is dispersed as an emulsion of fine particles in water, and then the solvent used is removed therefrom. Thus an aqueous dispersion of the highly saturated copolymer rubber is obtained. As the solution of the highly saturated copolymer rubber, there can be mentioned (i) a polymer solution as obtained by the polymerization and the subsequent hydrogenation, (ii) a concentrated or diluted solution of the polymer solution (i), and (iii) a solution obtained by dissolving a solid polymer in a solvent. As the solvent for dissolving the highly saturated copolymer rubber, there can be mentioned aromatic solvents such as benzene, toluene and xylene, halogenated hydrocarbon solvents such as dichloroethane and chloroform, and ketches such as methyl ethyl ketone, acetone and tetrahydrofuran. These solvents may be used either alone or in combination. The concentration of the highly saturated copolymer rubber in the solution is usually in the range of 1 to 25% by weight.

As the emulsifier used for the preparation of the aqueous emulsifier solution, there can be mentioned those which are conventional and include, for example, aliphatic acids such as oleic acid and stearic acid, potassium salts and sodium salt of resin acid, an alkylbenzenesulfonic acid and an alkylsulfate ester, and a polyoxyethylene type nonionic emulsifier. The emulsifier may be used either alone or in combination. The ratio of the aqueous emulsifier solution to the solution of the highly saturated copolymer rubber is usually in the range of 3/1 to 1/20 by volume. As a stirrer for agitating the mixture of the highly saturated copolymer rubber solution with the emulsifier solution, for example, a homo-mixer and an ultrasonic emulsifier are used. The removal of the solvent from the copolymer emulsion is effected by a known means such as steam stripping. The thus-prepared copolymer emulsion is consigned at a solid content of 1 to 70% by weight.

As the method of directly hydrogenating a latex of a nitrile group-containing unsaturated copolymer, known methods are used, which include, for example, a method using a palladium-containing catalyst (JP-A 2-178305), a method using a rhodium-containing catalyst (JP-A 59-115303 and 56-133219, and U.S. Pat. No. 3,898,208) and a method using a ruthenium-containing catalyst (JP-A 6-184223 and 6-192323). More specifically, for example, in the method using a palladium catalyst as described in JP-A 2-178305, an organic solvent capable of dissolving or swelling the nitrile group-containing unsaturated copolymer is incorporated in the copolymer latex, followed by hydrogenation. According to this method, the nitrile group-containing unsaturated copolymer in the copolymer latex is swollen in the incorporated organic solvent and therefore a hydrogenation catalyst can easily access to unsaturations of the unsaturated copolymer. Thus the hydrogenation can be carried out at an enhanced efficiency while the aqueous emulsion is maintained.

As specific examples of the organic solvent used for the direct hydrogenation method, there can be mentioned aromatic solvents such as benzene, toluene, xylene and ethylbenzene, halogenated hydrocarbon solvents such as dichloroethane, chloroform and chlorobenzene, ketones such as methyl ethyl ketone, acetone, cyclohexanone and cyclopentanone, esters such as methyl acetate, ethyl acetate, propyl acetate and butyl acetate, higher alcohols such as diacetone alcohol and benzyl alcohol, ethers such as dioxane and tetrahydrofuran, and nitriles such as acetonitrile, acrylonitrile and propionitrile. These organic solvents may be used either Alone or in combination.

The amount of the organic solvent is up to three parts by volume per part of the copolymer latex. Even though the amount of the organic solvent exceeds this range, hydrogenation occurs. But, if the amount of the organic solvent is too large, the emulsion is easily destroyed and separated into a solvent phase and an aqueous phase, and therefore, an operation for separating the solvent phase and the aqueous phase and an operation of recovering the hydrogenated copolymer from the solvent phase are necessary. Where the ratio of the copolymer latex to the organic solvent is in the range of 1/3 to 1/1.5 by volume, hydrogenation can be carried out while the state of emulsion is maintained, but the emulsion is apt to be destroyed after the hydrogenation is completed. Therefore the ratio of the copolymer latex to the organic solvent is preferably in the range of 1/1 to 1/0 by volume to maintain the state of emulsion after the completion of hydrogenation.

In the case where enlargement of the copolymer emulsion particles is suppressed during hydrogenation and thus copolymer emulsion particles having substantially the same size as that of the particles before hydrogenation are obtained, the organic solvent is used in an amount such that the ratio of aqueous copolymer emulsion/organic solvent is maintained in the range of 1/1 to 1/0 by volume. If the amount of the organic solvent exceeds this range, the copolymer emulsion particles coalesce or are destroyed during hydrogenation and thus the resulting copolymer emulsion particles have different sizes from those before hydrogenation. There is no critical lower limit in the amount of the organic solvent, but, in order to conduct hydrogenation uniformly and at a high efficiency, the copolymer latex/organic solvent ratio is preferably in the range of 1/1 to 1/0.05 by volume.

The time at which the organic solvent is incorporated is not particularly limited, and the organic solvent may be incorporated before, after or simultaneously with the addition of a hydrogenation catalyst. Where the hydrogenation catalyst used is soluble in the organic solvent, it is preferable to add the catalyst as a solution in the organic solvent in view of the efficiency in hydrogenation and simplicity in operation.

As the hydrogenation catalyst, palladium compounds are used. As specific examples of the palladium compound, there can be mentioned palladium salts of a carboxylic acid such as formic acid, propionic acid, lauric acid, succinic acid, stearic acid, oleic acid, phthalic acid or benzoic acid; and inorganic compounds and complex compounds, which include chlorine-containing palladium compounds such as palladium chloride, dichloro(cyclooctadiene)palladium, dichloro(norbornadiene)palladium, dichloro(benzonitrile) palladium, dichlorobis(triphenylphosphine)palladium, ammonium tetrachloropalladate(II) and ammonium hexachloropalladate (IV), palladium bromide, palladium iodide, palladium sulfate dihydrate, potassium tetracyanopalladate(II) trihydrate. Of these, a palladium carboxylate, dichloro (norbornadiene)palladium and ammonium hexachloropalladate (IV) are preferable.

The amount of the hydrogenation catalyst varies depending upon the particular unsaturated nitrile copolymer and the degree of hydrogenation, but is usually in the range of 5 to 10,000 ppm, preferably 10 to 6,000 ppm, based on the copolymer. The use exceeding 10,000 ppm is not advantageous from an economical viewpoint.

The hydrogenation temperature is usually in the range of 0° to 300° C., preferably 20° to 150° C. A temperature higher than 300° C. may be employed, but side reactions tend to occur and badly influence the selective hydrogenation of carbon-to-carbon unsaturation. The side reactions include, for example, hydrogenation of the organic solvent and hydrogenation of the ethylenically unsaturated monomer units (e.g., nitrile group in acrylonitrile units) in the unsaturated nitrile copolymer.

As the source of hydrogen, gaseous hydrogen or dissolved hydrogen is used. The hydrogen pressure employed is in the range of 1 atm to 300 kg/cm$^2$, preferably 5 to 200 kg/cm$^2$. A hydrogen pressure exceeding 300 kg/cm$^2$ may be employed, but is not preferable because of enhanced cost of equipment and poor operating characteristics. Usually a hydrogen pressure of several arm to several tens arm is employed.

When the hydrogenation is completed, an ion exchange resin is added to the reaction mixture whereby the catalyst is adsorbed, and then the adsorbed catalyst is removed by a conventional means such as centrifugal separation or filtration. A hydrogenated nitrile group-containing copolymer containing the residual catalyst can also be used.

To obtain an aqueous emulsion of the nitrile group-containing highly saturated copolymer rubber, the organic solvent is removed from the reaction mixture by a conventional means such as steam stripping. If desired, the obtained aqueous emulsion of the hydrogenated copolymer is concentrated by an ordinary device such as a rotary evaporator or a high-speed centrifugal separator. Preferably the total solid content in the concentrated emulsion is 10 to 70% by weight.

The aqueous emulsion of the hydrogenated copolymer or the non-emulsion reaction liquid is brought into direct contact with steam, or a poor solvent is incorporated in the aqueous emulsion or non-emulsion reaction liquid, whereby the hydrogenated copolymer is precipitated. The precipitate is dried by hot air drying, vacuum drying or extrusion drying to obtain a solid nitrile group-containing highly saturated copolymer rubber.

The above-mentioned direct hydrogenation method wherein an unsaturated copolymer is hydrogenated in an emulsion state is advantageous in shortening of process and labor-saving, as compared with the conventional method wherein a solid unsaturated copolymer is recovered from the polymerization mixture, and dissolved in an organic solvent, and then hydrogenated in a solution state.

Vulcanizable Rubber Composition

A sulfur-containing vulcanizer is incorporated in the nitrile group-containing highly saturated copolymer rubber of the present invention to provide a vulcanizable rubber composition. The rubber composition having a sulfur-containing vulcanizer incorporated therein exhibits an excellent high-rate vulcanizability. As specific examples of the sulfur-containing vulcanizer, there can be mentioned sulfur such as powdered sulfur, flower of sulfur, precipitated Sulfur, colloidal sulfur, surface-treated sulfur and insoluble sulfur, and sulfur-containing compounds such as sulfur chloride, sulfur dichloride, morphorine disulfide, an alkylphenol disulfide, N,N'-dithio-bis(hexahydro-2H-azepinon-2), sulfur-containing polysulfide and high-molecular weight polysulfide. Further, sulfur-containing vulcanization promoters such as tetramethyl-thiuram disulfide, selenium dimethyl dithiocarbamate and 2-(4'-morphorinodithio) benzothiazole are included.

In combination with the sulfur-containing vulcanizer, a vulcanization promoter can be used which includes, for example, zinc white or stearic acid; or a guanidine, aldehyde-amine, aldehyde-ammonia, thiazole, sulfenamide, thiourea or xanthate promoter.

The amount of the sulfur-containing vulcanizer is not particularly limited, but is usually in the range of 0.10 to 10 parts by weight, preferably 0.1 to 5 parts by weight, per 100 parts by weight of the unsaturated nitrile-conjugated diene copolymer. If the sulfur-containing vulcanizer is not contained or the content thereof is too small, the high-rate vulcanization cannot be effected at a high-temperature short-time vulcanization.

A vulcanizer other than the sulfur-containing vulcanizer such as an organic peroxide vulcanizer can be used in combination with the sulfur-containing vulcanizer. As the organic peroxide vulcanizer, there can be mentioned, for example, tert-butyl hydroperoxide, cumene hydroperoxide, di-tert-butyl peroxide, tert-butylcumyl peroxide, 2,5-dimethyl-tert-butyl peroxyhexane, 2,5-dimethyl-tert-butyl peroxyhexane, 1,3-bis(tert-butyl peroxyisopropyl)benzene, p-chlorbenzoyl peroxide, tert-butyl peroxybenzoate, tert-butyl peroxyisopropylcarbonate and tert-butyl benzoate.

As other vulcanizers which can also be used in combination with the sulfur-containing vulcanizer, there can be mentioned polyfunctional compounds such as trimethylolpropane trimethacrylate, divinylbenzene, ethylene dimethacrylate and triallyl isocyanurate. Further, there can be mentioned a metallic soap/sulfuric vulcanizer, a triazine/dithiocarbamate vulcanizer, a polycarboxylic acid/onium salt vulcanizer, a polyamine vulcanizer such as hexamethylenediamine, triethylenetetramine, hexamethylenediamine carbamate, ethylenediamine carbamate or triethylenediamine, and an ammonium benzoate vulcanizer.

In the rubber composition, auxiliaries which are conventionally used in rubber compositions can be incorporated according to the need. Such auxiliaries include, for example, reinforcing materials such as various types of carbon black, silica and talc, fillers such as calcium carbonate and clay, processing aids, processing oils including plasticizers, antioxidants, and antiozonants.

Especially when the nitrile group-containing highly saturated copolymer rubber contains units of an ethylenically unsaturated carboxylic acid monomer such as acrylic acid, an oxide of a metal of group II of the periodic table can be incorporated in the rubber composition whereby a vulcanizate having an excellent dynamic fatigue resistance can be obtained.

As examples of the ethylenically unsaturated carboxylic acid monomer used for the preparation of the nitrile group-containing highly saturated copolymer rubber, there can be mentioned acrylic acid, methacrylic acid, itaconic acid, fumaric acid, maleic acid and monoesters of these dicarboxylic acids. The content of the ethylenically unsaturated carboxylic acid units is preferably in the range of 0.1 to 15% by weight based on the weight of the copolymer, in view of the strength and dynamic fatigue resistance. When the content is smaller than 0.1% by weight, the intended high fatigue resistance and strength cannot be obtained. When the content is too large, the water resistance is reduced.

As examples of oxides of metal of group II of the periodic table, there can be mentioned magnesium oxide, zinc oxide, calcium oxide and strontium oxide. Of these, zinc oxide and magnesium oxide are preferable. The amount of the metal oxide is preferably 0.5 to 30 parts by weight per 100 parts by weight of the highly saturated copolymer rubber.

Various thermoplastic resins can be incorporated in the vulcanizable rubber composition of the present invention. Especially a vinyl chloride resin is noteworthy.

To impart good weather resistance, ozone resistance and sour gasoline resistance to a nitrile group-containing highly saturated copolymer rubber, a proposal has been made wherein a vinyl chloride resin is incorporated with the highly saturated nitrile rubber (U.S. Pat. No. 4,350,796). However, the nitrile group-containing highly saturated copolymer rubber has a poor high-rate vulcanizability with sulfur, and the vulcanizate has poor mechanical strength and large compression set. Further when a mold is repeatedly used for injection molding the vinyl chloride resin-incorporated highly saturated copolymer rubber, staining materials are gradually deposited thereon.

In contrast, the vulcanizable rubber composition of the present invention having incorporated therein a vinyl chloride resin exhibits a good high-rate vulcanizability and gives a vulcanizate having a high mechanical strength and a low compression set, as well as good weather resistance and sour gasoline resistance. Further the problem of mold contamination does not arise.

The vinyl chloride resin used is not particularly limited, but usually those which have an average molecular weight of 600 to 2,000 are used. The mixing ratio of the vinyl chloride resin and the nitrile group-containing highly saturated copolymer rubber is usually such that the amount of the copolymer rubber is 95 to 50 parts by weight, preferably 80 to 60 parts by weight, and the amount of the vinyl chloride resin is 5 to 50 parts by weight, preferably 20 to 40 parts by weight, based on the total weight of the copolymer rubber and the vinyl chloride resin. Especially a blend composed of about 70 parts by weight of a hydrogenated acrylonitrile-butadiene copolymer rubber and about 30 parts by weight of a vinyl chloride resin is most preferable.

The procedure by which the nitrile group-containing highly saturated copolymer rubber and the vinyl chloride resin is not particularly limited. Usually there are adopted a dry blending method wherein a powdery vinyl chloride resin and a powdery copolymer rubber are mixed together at a high temperature, for example, by a Bambury mixer, and a co-precipitating method wherein a latex of the copolymer rubber and a latex of the vinyl chloride resin are mixed together, the mixture is coagulated, and the thus-formed precipitate is dried and then heat-treated, for example, by an extruder or a Bambury mixer.

If desired, other rubbers can be incorporated in combination with the nitrile group-containing highly saturated copolymer rubber in the rubber composition of the present invention, which include, for example, an acrylic rubber, a fluororubber, a styrene-butadiene copolymer rubber, an ethylene-propylene-diene terpolymer rubber (EPDM), natural rubber and a polyisoprene rubber.

Adhesive Composition

The adhesive composition of the present invention comprises an aqueous emulsion of the above-mentioned nitrile group-containing highly saturated copolymer rubber and a resorcinol-formaldehyde resin.

The resorcinol-formaldehyde resin (RF) is not particularly limited, and those which are well known (see, for example, JP-A 55-142635) can be used. The amount of RF in the adhesive composition is usually in the range of 10 to 180 parts by weight (dry base) based on 100 parts by weight of the solid content in the aqueous emulsion of the highly saturated copolymer rubber.

The composition of RFL, i.e., a mixture of RF and a rubber latex, is not particularly limited, but preferably the ratio of the rubber latex (solid content) to the range of 10/1 to 2/1 by weight. The ratio of to formaldehyde in RF also is not particularly limited, but preferably in the range of 1/3 to 3/1, more preferably 1/2 to 1/1. As the RF solution, those which are conventionally used for adhesion under vulcanization conditions of a rubber composition with a fibrous reinforcing material.

If desired, a conventional adhesion-enhancing material can be used in combination with the resorcinol-formaldehyde resin, which includes, for example, 2,6-bis-(2,4-dihydroxyphenylmethyl)-4-chlorophenol and analogues thereto, an isocyanate, a blocked isocyanate, ethylene urea, polyepoxide and a modified vinyl resin. Further, provided that the object of the present invention is attained, a part of the emulsion of the highly saturated copolymer rubber can be substituted by another rubber latex such as a styrene-butadiene copolymer rubber latex or a carboxyl-modified latex thereof, an acrylonitrile-butadiene copolymer rubber latex or a carboxylmodified latex thereof, or natural rubber latex.

The adhesive composition of the present invention is particularly useful for treating a fibrous material for reinforcing a rubber. As the fibrous material treated, there can be mentioned organic fibers which are not particularly limited and include, for example, a polyvinyl alcohol fiber, a polyester fiber; a polyamide fiber and an aramid fiber (i.e., an aromatic polyamide fiber). These organic fibers can be used in the form of, for example, a staple fiber, a filament, a cord, a rope or canvas.

The procedure for treating the fibrous material with the adhesive composition is not particularly limited, and a conventional procedure can be employed. For example, the fibrous material is dipped in the adhesive composition, and, if desired, dried at a temperature of 100° to 150° C. for 0.5 to 10 minutes, and then heat-treated. The heat-treating conditions are not particularly limited provided that the adhesive composition deposited on the fibrous material is sufficiently cured. Usually the heat-treated is carried out at a temperature of about 140° to about 250° C. for several minutes.

The adhesive composition is advantageously used for bonding the reinforcing fibrous material to a rubber adherend to make a fiber/rubber composite. As the rubber adherend, nitrile group-containing highly saturated copolymer rubbers are preferably used. The highly saturated copolymer rubbers preferably have a nitrile content of 10 to 60% by weight in view of oil resistance and an iodine value of not larger than 120, preferably not larger than 80 in view of heat resistance.

As specific examples of the nitrile group-containing highly saturated copolymer rubber used as the rubber adherend, there can be mentioned a highly saturated butadiene-acrylonitrile copolymer rubber, a highly saturated isoprene-butadiene-acrylonitrile copolymer rubber, a highly saturated isoprene-acrylonitrile copolymer rubber, a highly saturated butadiene-methyl acrylate-acrylonitrile copolymer rubber, a highly saturated butadiene-acrylic acid-acrylonitrile copolymer rubber, a highly saturated butadiene-ethylene-acrylonitrile copolymer rubber and a highly saturated butyl acrylate-ethoxyethyl acrylate-vinyl-norbornene-acrylonitrile copolymer rubber. A nitrile group-containing highly saturated copolymer rubber having substantially the same composition as that used as an emulsion for treating the reinforcing fibrous material is most preferable.

The method for bonding, under vulcanizing conditions, the rubber adherend to the fibrous material having been treated with the adhesive composition, is not particularly limited. Usually a vulcanizer, a filler and other additives are incorporated with the highly saturated nitrile rubber to prepare a rubber composition, and the fibrous material having been treated with the adhesive composition is embedded in the rubber compositions, followed by vulcanization. Usually the vulcanization is usually conducted at a temperature of 120° to 180° C. under a pressure of 0.5 to 10 MPa for 1 to 120 minutes.

In the rubber adherend, a sulfur-containing vulcanizer, a vulcanizing promotor, a filler and other additives are incorporated. The kinds and amounts of the vulcanizer and other additives can be the same as those described with regard to the rubber compositions of the present invention.

The invention will now be described specifically by the following examples. Parts and % in the following examples, comparative examples and reference examples are by weight unless otherwise specified.

Characteristics of copolymers, vulcanizable rubber compositions and rubber vulcanizates were determined as follows.

(1) Properties of copolymers (i) Bound nitrile content (%)

Bound nitrile content was determined by measuring the content of nitrogen in the copolymer by the Kjeldahl method according to JIS K6384, and calculating the bound nitrile content from the nitrogen content.

(ii) Mooney viscosity

Measurement was carried out at 100° C. on about 40 g of a copolymer sample according to JIS K6383.

(iii) Molecular weight and molecular weight distribution

Number average molecular weight (Mn) and weight average molecular weight (Mw) of a copolymer before hydrogenation in terms of those of standard polystyrene were measured by gel permeation chromatography using tetrahydrofuran as a solvent. The proportion (%) of the fraction having an Mn not larger than 35,000 to the total weight of the copolymer was calculated as the ratio (%) of the area of said fraction to the entire area of the molecular weight distribution.

(iv) Breadth ($\Delta AN$) of the compositional distribution of unsaturated nitrile Determination of $\Delta AN$ was made on the copolymer before hydrogenation by using a high-speed liquid chromatography. The method of determination is described in Rubber Chemistry and Technology, vol. 63, [2] p181–191 (1990). Namely, chromatogram was prepared by a high-speed chromatography under the following conditions. $\Delta AN$ was the half-value width of the chromatogram. For the determination of $\Delta AN$, a calibration chart showing the relationship of the amount of eluate with the amount of unsaturated nitrile was prepared by using a copolymer sample containing a known amount of unsaturated nitrile.

(a) Column

Gel: crosslinked 2-chloroacrylonitrile/ethylene dimethacrylate copolymer

Diameter of gel particles: 2 to 6 μm

Column: made of stainless steel

Column diameter × length: 0.46 cm ×25 cm (b) Eluting solution

At the initial chloroform/n-hexane ratio (30/70 by weight), the eluting solution was allowed to flow for 20 minutes and then, eluated from 30/70 to 100/0 in a gradient manner over a period of 30 minutes.

(c) Rate of flow: 0.5 ml/min.

(d) Concentration of sample: 1 wt. % in chloroform (e) Injection amount: 10 to 20 μl (f) Detector: light scattering mass detector Model 750/14 made by ACS Co.

(g) Instrument: Trirotor VI made by Nippon Bunko (v) Concentration (% by mole) of a 1,1-di(2,2-dimethylpropyl)-1-ethylthio group Concentration of the ethylthio group in the copolymer before hydrogenation was determined as follows. The copolymer was dissolved in benzene, and then coagulated in methyl alcohol. This operation of dissolution and coagulation was repeated three times, and then the copolymer was purified. The purified copolymer was subjected to the measurement by NMR as follows. By measurement using $^1$H-NMR (400 MHz), a peak due to a proton of the terminal methyl group in the 1,1-di(2,2-dimethylpropyl)-1-ethylthio group was detected in the vicinity of 1.05 ppm. By measurement using $^{13}$C-NMR (100 MHz), a peak due to the C atom of -$CH_2$-group in said ethylthio group was detected in the vicinity of 54.6 ppm.

The concentration of the ethylthio group in copolymer wag determined by calculation from the ratio (A/B) of (A) an integrated value of a peak due to the terminal methyl group as detected by $^1$H-NMR measurement to (B) an integrated value of a peak detected in the vicinity of 4.8 to 5.8 ppm due to a proton bound to an unsaturation of butadiene.

(2) Properties of vulcanizable rubber composition (i) High-Rate Vulcanizability

Using 10g of an unvulcanized rubber composition prepared according to the recipe shown in Table 1 (where the unvulcanized rubber composition contained a vinyl chloride resin, the composition was prepared according to the recipe shown in Table 2), the scorch time ($T_5$ in minute) and the maximum torque ($V_{max}$ in kgf.cm) at a temperature of 160° C. were determined: by an oscillating disc rheometer according to the Society of Rubber Industrial Japan Standard SRIS 3102. The smaller the $T_5$ value, the higher the rate of vulcanization. The larger the $V_{max}$ value, the larger the crosslinking efficiency.

TABLE 1

| Ingredients | Amount (parts by weight) |
| --- | --- |
| Copolymer | 100 |
| Zinc oxide | 5 |
| Stearic acid | 1 |
| Sulfur (325 mesh) | 0.5 |
| SRF carbon black | 6.0 |
| Dioctyl phthalate | 5 |
| Tetramethylthiuram disulfide | 1.5 |
| N-cyclohexyl-2-benzothiazyl-sulfenamide | 1.5 |

TABLE 2

| Ingredients | Amount (parts by weight) |
| --- | --- |
| Copolymer/vinyl chloride resin | 100 |
| Zinc oxide | 5 |
| Stearic acid | 1 |
| Sulfur (325 mesh) | 0.5 |
| SRF carbon black | 60 |
| Dioctyl phthalate | 5 |
| Tetramethylthiuram disulfide | 1.5 |
| N-cyclohexyl-2-benzothiazyl-sulfenamide | 1.5 |
| Octylated diphenylamine | 1 |

(ii) Contamination of Mold

An vulcanized rubber composition was prepared according to the recipe shown in Table 1 or Table 2, and the rubber composition was filled in a hole with a diameter of 12 mm of a metal plate having a thickness of 2 mm. The rubber composition-filled metal plate was sandwiched between two mild steel sheets (JIS G3141) each having a thickness of 1 mm. Then the rubber composition in the sandwiched metal plate was vulcanized at a temperature of 220° C. and a pressure of 20 kg/cm$^2$ for 2 minutes. The vulcanized rubber composition was removed and then an unvulcanized rubber composition was again filled in the hole of the metal plate, followed by vulcanization. This operation of removal of a vulcanized rubber composition, and filling and vulcanization of an unvulcanized rubber composition was repeated 50 times, and the contamination of the contact surface of each mild steel sheet was evaluated.

The degree of contamination was expressed by five ratings. Rating 1 means that there was no contamination on the mild steel sheets, and rating 5 means that the entire contact surface of each mild steel sheet was contaminated to the greatest extent.

(iii) Processability

An unvulcanized rubber composition was extruded by using a Garvey die according to ASTM D-2230-77 to determine the die swell (%) and the extrusion rate (g/min). Further, the configuration and state of the rubber extrudate was evaluated on the degree of porosity and degree of swelling, and the edge portion, surface and corner portion thereof. The evaluation results were expressed by five ratings. Rating 5 and rating 1 means the best and worst configuration and state, respectively.

(3) Properties of rubber vulcanizate (i) Tensile Strength (kgf/cm$^2$)

According to Japanese Industrial Standard (JIS) K6301, an unvulcanized rubber formulation prepared according to the recipe shown in Table 1 or Table 2 was vulcanized at a temperature of 160° C. for 20 minutes to give a sheet having a thickness of 2 mm. A #3 dumbbell specimen was cut out from the sheet, and the tensile strength was measured.

(ii) Elongation at Break (%)

Elongation was measured on a specimen prepared by the same procedure as that for the determination of tensile strength.

(iii) Tensile Stress at 100% elongation (kgf/cm$^2$)

Tensile stress at 100% elongation was measured on a specimen prepared by the same procedure as that for the determination of tensile strength.

(iv) Hardness(JIS)

Hardness was measured by using a JIS spring-type A hardness tester.

(v) Compression Set (%)

Compression set was measured after the specimen was maintained at a temperature of 120° C. for 22 hours.

(vi) Oil Resistance (volume change in %)

Oil resistance was evaluated according to JIS K630 by the volume change (%) as measured after immersion of the specimen in a #3 lubricating oil having a kinetic viscosity of 31.9 to 34.1, an aniline point of 68.5° to 70.5° C. and a flash point of 162.7° at a temperature of 120° C. for 72 hours.

With regard to the rubber vulcanizate having a vinyl chloride resin incorporated therein, the specimen was immersed in Fuel C (i.e., a mixed liquid composed of 50% by volume of iso-octane and 50% by volume of toluene) at a temperature of 40° C. for 48 hours.

(vii) Cold Resistance ($T_{10}$ in °C.)

Cold resistance was evaluated according to JIS K6301 by a Gehman tortional test method, and expressed by the temperature ($T_{10}$ in °C.) at which the tortion angle reached 10 times of the tortion angle as measured at 23° C. The lower the $T_{10}$, the better the cold resistance.

(viii) Ozone Resistance (Weather Resistance)

Ozone resistance was evaluated according to JIS K6301 by elongating 20% under static conditions at an ozone concentration of 80pphm and a temperature of 40° C., allowing to stand for 12 hours, 24 hours, 48 hours and 72 hours, and thereafter observing the state of crack formation.

With regard to the rubber vulcanizate having a vinyl chloride resin incorporated therein, the specimen was immersed in fuel C (i.e., a mixed liquid composed of 50% by volume of isooctane and 50% by volume of toluene) at a temperature of 40° C. for 168 hours, and air-dried at room temperature for one week thereafter ozone resistance was evaluated by elongating 20% under static conditions at an ozone concentration of 40 ppm and a temperature of 40° C., allowing to stand for 12 hours, 24 hours and 72 hours, and thereafter observing the skate of crack formation.

(ix) Heat Aging Resistance

Heat aging resistance was evaluated according to JIS K6301 by allowing to stand at a temperature of 120° C. for 72 hours and thereafter measuring the tensile strength, elongation at break and hardness, and expressed by the change of these properties.

(x) Sour Gasoline Resistance

Strip specimens were immersed in JIS fuel oil B (mixed liquid of isooctane/toluene=70/30 by volume) containing 1% by weight of lauroyl peroxide at a temperature of 40° C. for 72 hours. The JIS fuel B was renewed and the renewal was repeated every 72 hours. A period of 72 hours was taken as one cycle, and one specimen was taken out from the mixed liquid at the end of each cycle. The specimen taken out was then dried at a temperature of 60° C. under a reduced pressure for one week, and thereafter was bent through 180°. Occurrence of cracks was observed on bent specimens which were taken out at the end of the second, fourth and eighth cycles. NC means that no cracks occurred.

(xi) Metal Corrosion

Corrosion of a metal plate SAE 1020 was tested according to the General Motor (GM) method as follows. An unvulcanized rubber composition prepared according to the recipe shown in Table 1 was vulcanized at a temperature of 160° C. for 20 minutes by a conventional procedure to give a sheet having a thickness of 2 mm. Specimens having a size of 2 mm×5 cm×5 cm were prepared from the sheet. Each specimen was sandwiched between two metal sheets (SAE 1020, abraded with abrasive grains of 400 mesh), and a load of 5 kg was applied on the pile. Then the pile was placed in a thermo-hygrostat and was allowed to stand for 96 hours at a temperature of 50° C. Thereafter the specimen was taken out and the state of surface corrosion was observed. The degree of surface corrosion was expressed by six ratings spanning from 0 to 5. Rating 0 means that no corrosion was observed. Rating 5 means that the entire Surface was corroded.

(xii) Fatigue Resistance

JIS #3 dumbbell specimen was cut out from a vulcanized sheet. Using a constant-stress elongation fatigue tester (supplied by Uejima Seisakusho), a load of 50 kgf/cm² was applied to draw the specimen at room temperature or at 100° C. and then the specimen was unloaded at the same temperature. This loading-unloading was repeated at a rate of 400 times per minute until the specimen was broken. The fatigue test was conducted ten times and the fatigue resistance was expressed by the average number of repeated times of loading-unloading at which the specimen was broken.

EXAMPLES 1–5

A reactor having an inner volume of 10 liters was charged with 2 parts of potassium oleate as an emulsifier, 0.1 part of potassium phosphate as a stabilizer and 150 parts of water, and further, butadiene, acrylonitrile and 2,2',4,6,6'-pentamethylheptane-4-thiol (hereinafter abbreviated to "PMHT") as a molecular weight modifier (the amounts of these ingredients are shown in Table 3) were added. By incorporating 0.015 part of ferrous sulfate as an activator and 0.05 part of p-menthane hydroperoxide, an emulsion polymerization was commenced at a temperature of In the preparation of part of acrylonitrile-butadiene copolymers, when the conversion reached to a predetermined value shown in Table 3, acrylonitrile (preparation of copolymers I–IV), butadiene (preparation of copolymer V) and PMHT (preparation of copolymers I–V) were additionally incorporated in the polymerization mixture. When the conversion reached a predetermined value shown in Table 3, 0.2 part of hydroxylamine sulfate per 100 parts of the monomers was added to terminate polymerization. Then the polymerization mixture was heated and subjected to a steam distillation at about 70° C. under a reduced pressure to recover residual monomers. As an aging stabilizer 2 parts of an alkylated phenol was added to obtain a Copolymer latex.

To this copolymer latex, 0.25 part of an oxyethylene-oxypropylene adduct to an alkylphenol-formaldehyde condensate (Latemul, NP-5150) as a nonionic surface active agent was added. Then the copolymer latex was incorporated dropwise into a 5 liter-volume coagulating vessel, equipped with a stirrer, having charged with an aqueous coagulating solution containing 3 parts of aluminum sulfate as a coagulating agent. The latex-incorporated coagulating solution was maintained at 50° C. to coagulate the copolymer. The thus-obtained crumbs were taken out, and washed with water and then dried at 50° C. under a reduced pressure to obtain acrylonitrile-conjugated diene copolymers I to V.

The copolymer was dissolved in methyl isobutyl ketone and then hydrogenated by using a palladium/silica catalyst in a pressure vessel to obtain each of nitrile group-containing highly saturated copolymer rubbers I–V.

The polymerization conditions, bound acrylonitrile content, bound butadiene content and concentration of an alkylthio group in the copolymer before hydrogenation and Mooney viscosity and other characteristics of the copolymer after hydrogenation are shown in Table 3.

According to the recipe shown in Table 1, the highly saturated copolymer rubber was kneaded together by a Banbury mixer to obtain a rubber composition. The rubber composition was subjected to press vulcanization at 160° C. for 20 minutes, and the physical properties of the vulcanizate were evaluated. The results are shown in Table 4.

COMPARATIVE EXAMPLES 1–3

Butadiene and acrylonitrile were copolymerized by the same procedures as employed in Example 2, except that commercially available t-dodecyl mercaptan was used as a molecular weight modifier instead of PMHT, and butadiene, acrylonitrile and the molecular weight modifier were charged at a time before commencement of polymerization.

The obtained copolymers were hydrogenated to obtain nitrile group-containing highly saturated copolymer rubbers VI–VIII. The results of evaluation of these copolymers and hydrogenated products thereof are shown in Table 3. The copolymer rubbers were made into rubber sheets, followed by press vulcanization. The properties of the thus-obtained vulcanizates are shown in Table 4.

TABLE 3

| Hydrogenated copolymer | I | II | III | IV | V | VI | VII | VIII |
|---|---|---|---|---|---|---|---|---|
| Hydrogenated copolymer | | | | | | | | |
| Iodine value | 15 | 5 | 15 | 30 | 15 | 15 | 15 | 15 |
| Mooney viscosity | 72 | 86 | 81 | 73 | 78 | 68 | 78 | 76 |
| Copolymer before hydrogenation | | | | | | | | |
| Bound butadiene (%) | 66 | 56 | 56 | 56 | 50 | 66 | 56 | 50 |
| Bound acrylonitrile (%) | 34 | 44 | 44 | 44 | 50 | 34 | 44 | 50 |
| Concentration of alkylthio group (mole %) | 0.09 | 0.08 | 0.09 | 0.085 | 0.09 | — | — | — |
| ΔAN | 9 | 9 | 8 | 8 | 8 | 21 | 20 | 20 |
| Fraction of Mn ≦ 35,000 (%) | 12 | 13 | 12 | 12 | 13 | 3 | 3 | 3 |
| Polymerization conditions | | | | | | | | |
| Monomers | | | | | | | | |
| Butadiene | | | | | | | | |
| Amount charged (parts) | 71 | 40 | 40 | 40 | 20 | 67 | 50 | 40 |
| Amount added (parts) | — | — | — | — | 10[42] | — | — | — |
| [Conversion on addition] (%) | | | | | 10[60] | | | |
| Acrylonitrile | | | | | | | | |
| Amount charged (parts) | 22 | 5 | 5 | 5 | 60 | 33 | 50 | 60 |
| Amount added (parts) | 4[35] | 9[60] | 9[60] | 9[60] | — | — | — | — |
| [Conversion on addition] (%) | 3[55] | | | | | | | |
| MW modifier | | | | | | | | |
| PMHT | | | | | | | | |
| Amount charged (parts) | 0.28 | 0.28 | 0.28 | 0.28 | 0.28 | — | — | — |
| Amount added (parts) | 0.17 | 0.17 | 0.17 | 0.17 | 0.17 | — | — | — |
| [Conversion an addition] (%) | [50] | [50] | [50] | [50] | [50] | — | — | — |
| TDM | | | | | | | | |
| Amount charged (parts) | — | — | — | — | — | 0.45 | 0.45 | 0.45 |
| Polymerization time (hr) | 13 | 13 | 13 | 13 | 14 | 13 | 15 | 15 |
| Conversion on termination (%) | 75 | 80 | 80 | 80 | 75 | 80 | 90 | 85 |

Molecular weight modifier: PMHT = 2,2',4,6,6'-Pentamethylheptane-4-thiol  TDM = tert-Dodecylmercaptan

TABLE 4

| | Example | | | | | Comparative Example | | |
|---|---|---|---|---|---|---|---|---|
| | 1 | 2 | 3 | 4 | 5 | 1 | 2 | 3 |
| Hydrogenated copolymer | I | II | III | IV | V | VI | VII | VIII |
| High-speed vulcanizability | | | | | | | | |
| Scorch time $T_5$ (min) | 3.0 | 3.2 | 3.0 | 2.7 | 2.9 | 4.0 | 4.2 | 4.1 |
| Maximum torque $V_{max}$ (kgf.cm$^2$) | 68 | 65 | 70 | 74 | 72 | 58 | 60 | 60 |
| Physical properties in ordinary state | | | | | | | | |
| Tensile strength (kgf/cm$^2$) | 230 | 240 | 252 | 244 | 260 | 210 | 228 | 238 |
| Elongation at break (%) | 520 | 600 | 500 | 420 | 510 | 600 | 620 | 630 |
| Tensile stress at 100% elongation (kgf/cm$^2$) | 38 | 32 | 39 | 45 | 38 | 30 | 31 | 31 |
| Hardness (JIS) | 72 | 72 | 74 | 76 | 75 | 70 | 72 | 73 |
| Compression set (%) | 36 | 48 | 35 | 30 | 38 | 60 | 63 | 60 |
| Oil resistance | | | | | | | | |
| (volume change) (%) | +20 | +12 | +10 | +9 | +7 | +23 | +12 | +8 |
| Cold resistance | | | | | | | | |
| (Gehman $T_{10}$) (°C.) | −26 | −22 | −22 | −22 | −15 | −24 | −20 | −12 |
| Heat aging resistance | | | | | | | | |

TABLE 4-continued

|  | Example | | | | | Comparative Example | | |
|---|---|---|---|---|---|---|---|---|
| Hydrogenated copolymer | 1<br>I | 2<br>II | 3<br>III | 4<br>IV | 5<br>V | 1<br>VI | 2<br>VII | 3<br>VIII |
| Change of tensile stress | +2 | +0 | −1 | +2 | −1 | +3 | +2 | −2 |
| Change of elongation | −22 | −18 | −25 | −30 | −27 | −25 | −27 | −28 |
| Change of hardness | +3 | +3 | +3 | +4 | +4 | +3 | +3 | +4 |
| Ozone resistance *1 | | | | | | | | |
| 12 hr | NC | NC | NC | NC | NC | NC | NC | NC |
| 24 hr | NC | NC | NC | NC | NC | NC | NC | NC |
| 48 hr | NC | NC | NC | NC | NC | NC | NC | NC |
| 72 hr | NC | NC | NC | NC | NC | NC | NC | NC |
| Mold contamination | 1 | 1 | 1 | 1 | 1 | 3 | 3 | 3 |
| Metal corrosion | 0 | 0 | 0 | 0 | 0 | 0 | 0 | 0 |
| Processability | | | | | | | | |
| Die swell | 115 | 118 | 116 | 117 | 116 | 130 | 135 | 130 |
| Extrusion rate | 50.1 | 50.3 | 50.1 | 50.2 | 53.0 | 45 | 43 | 42 |
| Swelling porosity | 3 | 3 | 3 | 3 | 3 | 2 | 2 | 2 |
| Edge | 3 | 3 | 3 | 3 | 3 | 2 | 3 | 2 |
| Surface | 3 | 3 | 3 | 3 | 3 | 3 | 2 | 2 |
| Corner | 3 | 3 | 3 | 3 | 3 | 2 | 2 | 3 |
| Total | 12 | 12 | 12 | 12 | 12 | 9 | 9 | 9 |

*1 NC: Crack formation was not observed

Figure 2:
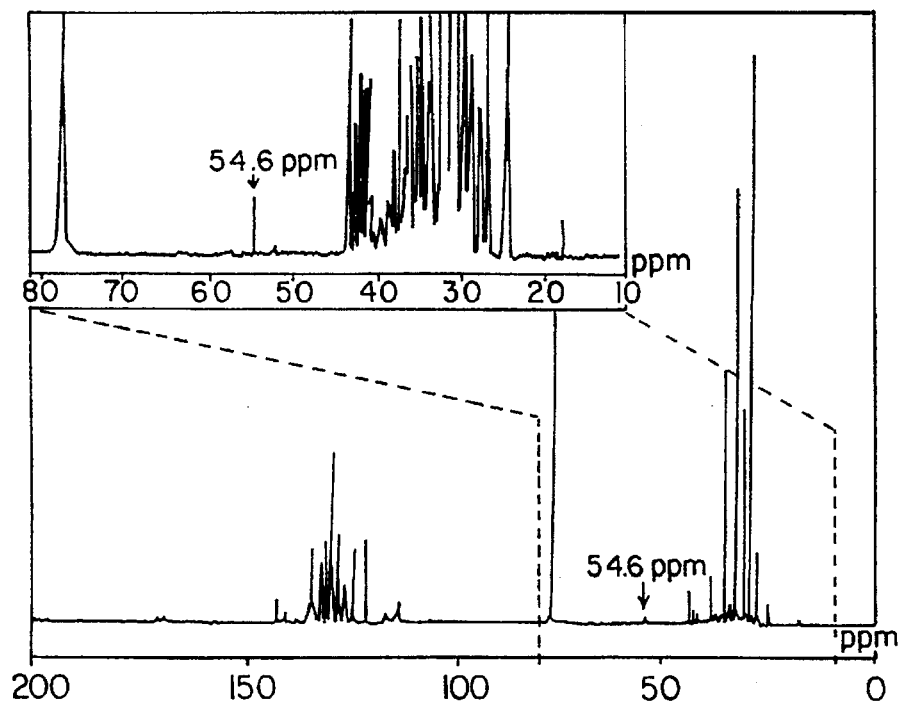
FIG. 2 is a chart of $^{13}$C-NMR determination of the unsaturated nitrile-conjugated diene copolymer I prepared in Example 1.
Figure 3:
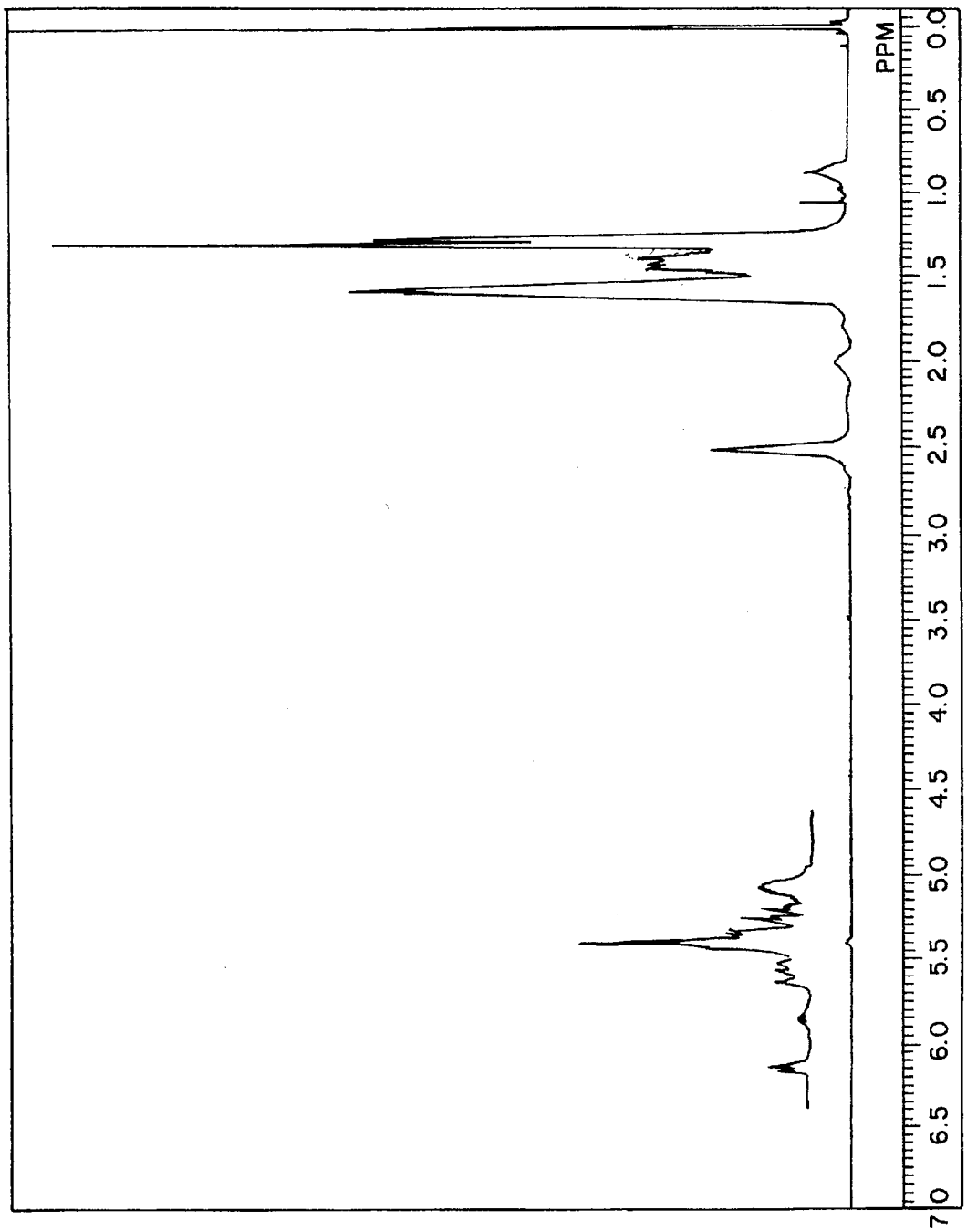
FIG. 3 is a chart of $^1$H-NMR determination of a nitrile group-containing highly saturated copolymer rubber obtained by hydrogenating the unsaturated nitrile-conjugated diene copolymer I prepared in Example 1.

A chart of $^1$-NMR determination of the unsaturated nitrile-conjugated diene copolymer I is shown in FIG. 1, and a chart of $^{13}$C-NMR determination of the unsaturated nitrile-conjugated diene copolymer I is shown in FIG. 2. A chart of $^1$H-NMR determination of the hydrogenation product (i.e., the nitrile group-containing highly saturated copolymer rubber) of the unsaturated nitrile-conjugated diene copolymer I is shown in FIG. 3.

NMR determinations of the other unsaturated nitrile-conjugated diene copolymers II to V revealed that these copolymers also had a 1,1-di(2,2'-dimethylpropyl)-1-ethylthio group.

As seen from Table 4, the vulcanizable rubber composition comprising each of the nitrile group-containing highly saturated copolymer rubbers I to V and a sulfur-containing vulcanizer exhibits a short scorch time ($T_5$) and an increased maximum torque ($V_{max}$), as measured by using an oscillating disc rheometer. Thus the rubber composition has an excellent high-rate vulcanizability. This leads to a vulcanizate having a high tensile stress at 100% elongation, a high strength, a high hardness and a reduced compression set. Thus the vulcanization efficiency is high. The heat aging resistance also is good and therefore the heat resistance is satisfactory. Further, the highly saturated copolymer rubber does not contain halogens and thus does not cause a problem of metal corrosion. A problem of mold contamination also does not arise.

Copolymers I to V were prepared by adding acrylonitrile or butadiene in lots during polymerization, and therefore, these copolymers exhibited a low ΔAN, a small $T_{10}$ as measured by the Gehman tortional test and a reduced change in volume after immersion in an oil, as compared with copolymers VI to VIII prepared by charging the monomers at once before the commencement of polymerization. Namely copolymers I to V have good and balanced oil resistance and cold resistance while keeping a high mechanical strength.

Further copolymer I to V were prepared by adding PMHT in lots during polymerization, and therefore, the highly saturated copolymer rubbers exhibited good and balanced processability and mechanical strength.

In contrast, copolymers VI to VIII, which were prepared by using t-dodecyl mercaptan, i.e., a conventional and commercially available molecular weight modifier widely used in radical polymerization, exhibit a poor high-rate vulcanizability, a low mechanical strength and a large compression set. NMR determination of these copolymers VI to VIII revealed that a 1,1-di(2,2-dimethylpropyl)-1-ethylthio group was not present in these copolymers.

EXAMPLES 6–11

By substantially the same polymerization procedures as described in Example 1, butadiene-acrylonitrile-unsaturated carboxylic acid ester copolymer rubbers were made. Each copolymer rubber was dissolved in methyl ethyl ketone, and hydrogenation of the butadiene portion of the copolymer rubber was conducted by using a palladium/silica catalyst whereby highly saturated copolymer rubbers A through f were obtained. By the same procedures as described in Example 1, a vulcanizable rubber composition was prepared from each highly saturated copolymer rubber, and the rubber composition was vulcanized. Properties of the vulcanizate were evaluated.

Cold resistance of the vulcanizate was evaluated by a TR testing method according to ASTM D-1329. The heat aging test was conducted according to JIS K6301 wherein a sample was allowed to stand for 150° C. for 72 hours and then the properties thereof were measured. The evaluation results are shown in Table 6. As seen from Table 6, the highly saturated copolymer rubbers having unsaturated carboxylic acid ester units copolymerized therein have an improved cold resistance while good heat resistance is kept.

TABLE 5

| Hydrogenated copolymer | A | B | C | D | E | F | G | H | I |
|---|---|---|---|---|---|---|---|---|---|
| Hydrogenated copolymer | | | | | | | | | |
| Iodine value | 25 | 25 | 25 | 25 | 25 | 25 | 15 | 15 | 15 |
| Mooney viscosity | 90 | 88 | 91 | 87 | 90 | 90 | 75 | 73 | 75 |
| Copolymer before hydrogenation | | | | | | | | | |
| Bound butadiene (%) | 45 | 50 | 40 | 45 | 60 | 60 | 68 | 58 | 48 |
| Bound acrylonitrile (%) | 15 | 25 | 15 | 25 | 15 | 25 | 25 | 35 | 45 |
| Bound di-n-butyl itaconate (%) | 40 | 25 | — | — | — | — | — | — | — |
| Bound diethylaminoethyl methacrylate (%) | — | — | 45 | 30 | — | — | — | — | — |
| Bound trifluoroethyl acrylate (%) | — | — | — | — | 25 | 15 | — | — | — |
| Bound acrylic acid (%) | — | — | — | — | — | — | 7 | 7 | 7 |
| Fraction of $M_n \leq 35,000$ (%) | 13 | 12 | 13 | 13 | 12 | 12 | 13 | 13 | 12 |
| $\Delta AN$ | 9 | 9 | 9 | 8 | 9 | 8 | 9 | 9 | 9 |
| Concentration of alkylthio group (mole %) | 0.09 | 0.10 | 0.08 | 0.10 | 0.09 | 0.08 | 0.09 | 0.09 | 0.08 |

TABLE 6

| | Examples | | | | | |
|---|---|---|---|---|---|---|
| | 6 | 7 | 8 | 9 | 10 | 11 |
| Hydrogenated copolymer | A | B | C | D | E | F |
| High-speed vulcanizability | | | | | | |
| Scorch time $T_5$ (min) | 2.9 | 3.0 | 2.1 | 2.1 | 3.1 | 3.2 |
| Maximum torque $V_{max}$ (kgf.cm) | 69 | 72 | 61 | 65 | 73 | 78 |
| Physical properties in ordinary state | | | | | | |
| Tensile strength (kgf/cm$^2$) | 213 | 241 | 164 | 182 | 171 | 192 |
| Elongation at break (%) | 310 | 460 | 310 | 340 | 330 | 340 |
| Tensil stress at 100% elongation (kgf/cm$^2$) | 32 | 29 | 34 | 32 | 33 | 31 |
| Hardness (JIS) | 62 | 67 | 63 | 69 | 65 | 69 |
| Compression set (%) | 32 | 31 | 38 | 33 | 33 | 31 |
| Cold resistance | | | | | | |
| ($TR_{10}$) (°C.) | −41 | −36 | −37 | −34 | −40 | −35 |
| Heat aging resistance | | | | | | |
| Change of tensile stress | +2 | −1 | −3 | −5 | +1 | −1 |
| Change of elongation | −25 | −31 | −35 | −37 | −24 | −28 |
| Change of hardness | +3 | +4 | +4 | +6 | +3 | +4 |

EXAMPLES 12–16, COMPARATIVE EXAMPLE 4

By the same procedures as described in Example 1, butadiene-acrylonitrile-acrylic acid copolymers were hydrogenated to obtain highly saturated copolymer rubbers G, H and I. Rubber compositions were prepared according to the recipe shown In Table 7, and vulcanized. The properties of the vulcanizates were evaluated. The results are shown in Table 8. As seen from Table 8, the vulcanizers of the present invention have an enhanced fatigue resistance.

TABLE 7

| | (parts by weight) | | |
|---|---|---|---|
| Recipe | 1 | 2 | 3 |
| Copolymer | 100 | 100 | 100 |
| Zinc oxide | 5 | 10 | — |
| Magnesium oxide | — | — | 10 |
| Stearic acid | 1 | 1 | 1 |
| Sulfur (325 mesh) | 0.5 | 0.5 | 0.5 |
| SRF carbon black | 60 | 60 | 60 |
| Dioctyl phthalate | 5 | 5 | 5 |
| Tetramethylthiram disulfide | 1.5 | 1.5 | 1.5 |
| N-cyclohexyl-2-benzothazyl-sulfenamide | 1.5 | 1.5 | 1.5 |

TABLE 8

|  | Examples | | | | | Co. Ex. |
|---|---|---|---|---|---|---|
|  | 12 | 13 | 14 | 15 | 16 | 4 |
| Hydrogenated copolymer | G | H | I | H | H | VI |
| Recipe | 1 | 1 | 1 | 2 | 3 | 1 |
| High-speed vulcanizability | | | | | | |
| Scorch time $T_5$ (min) | 1.8 | 1.6 | 1.7 | 1.3 | 1.4 | 4.0 |
| Maximum torque $V_{max}$ (kgf.cm) | 66 | 71 | 75 | 75 | 74 | 58 |
| Physical properties in ordinary state | | | | | | |
| Tensile strength (kgf/cm$^2$) | 342 | 353 | 351 | 325 | 311 | 210 |
| Elongation at break (%) | 430 | 410 | 390 | 410 | 390 | 600 |
| Tensile stress at 100% elongation (kgf/cm$^2$) | 46 | 51 | 55 | 49 | 47 | 30 |
| Hardness (JIS) | 70 | 71 | 72 | 71 | 70 | 70 |
| Compression set (%) | 56 | 58 | 59 | 58 | 62 | 60 |
| Fatigue resistance (elongation times × 10$^{-3}$) | | | | | | |
| at room temperature | 46 | 44 | 41 | 43 | 41 | 35 |
| at 100° C. | 1.2 | 1.1 | 0.9 | 0.9 | 0.8 | 0.4 |

EXAMPLES 17–23, COMPARATIVE EXAMPLES 5–7

Using copolymers I to V prepared in Examples 1 to 5 and copolymers VI to VIII prepared in Comparative Examples 1 to 3, vulcanizable highly saturated rubber compositions containing a vinyl chloride resin were prepared according to the recipe shown in Table 2 and were vulcanized by the same procedures as described in Examples 1 to 5 and Comparative Examples 1 to 3. The properties of the vulcanizable compositions and the vulcazates were evaluated. The results are shown in Table 9.

TABLE 9

|  | Examples | | | | | | | Comparative Examples | | |
|---|---|---|---|---|---|---|---|---|---|---|
|  | 17 | 18 | 19 | 20 | 21 | 22 | 23 | 5 | 6 | 7 |
| Hydrogenated copolymer | I | II | III | III | III | VI | V | VI | VII | VIII |
| Highly saturated copolymer/vinyl chloride resin ratio | 70/30 | 70/30 | 60/40 | 70/30 | 80/20 | 70/30 | 70/30 | 70/30 | 70/30 | 70/30 |
| High-speed vulcainizability | | | | | | | | | | |
| Scorch time $T_5$ (min) | 3.8 | 4.1 | 3.9 | 3.9 | 4.0 | 3.0 | 3.2 | 4.9 | 5.0 | 5.1 |
| Maximum torque $V_{max}$ (kgf.cm) | 57 | 52 | 56 | 59 | 60 | 64 | 62 | 46 | 48 | 48 |
| Physical properties in ordinary state | | | | | | | | | | |
| Tensile strength (kgf/cm$^2$) | 236 | 243 | 264 | 259 | 255 | 247 | 262 | 215 | 231 | 240 |
| Elongation at break (%) | 540 | 590 | 490 | 520 | 540 | 430 | 500 | 600 | 620 | 620 |
| Tensile stress at 100% elongation (kgf/cm$^2$) | 39 | 37 | 44 | 40 | 38 | 46 | 46 | 32 | 34 | 34 |
| Hardness (JIS) | 76 | 78 | 80 | 79 | 77 | 81 | 80 | 75 | 77 | 78 |
| Compression set (%) | 55 | 65 | 48 | 54 | 62 | 49 | 57 | 78 | 82 | 85 |
| Oil resistance (volume change) (%) | +31 | +13 | +10 | +17 | +25 | +29 | +5 | +36 | +19 | +9 |
| Cold resistance (Gehman $T_{10}$) °C.) | −28 | −24 | −19 | −22 | −25 | −23 | −17 | −26 | −22 | −14 |
| Heat aging resistance | | | | | | | | | | |
| Change of tensile stress | −5 | −3 | −4 | −4 | −5 | −6 | −5 | −5 | −4 | −5 |
| Change of elongation | −30 | −25 | −26 | −26 | −30 | −32 | −28 | −30 | −28 | −29 |
| Change of hardness | +4 | +3 | +5 | +4 | +5 | +6 | +3 | +5 | +4 | +3 |
| Ozone resistance *1 | | | | | | | | | | |
| 12 hr | NC | NC | NC | NC | NC | N | NC | NC | NC | NC |
| 46 hr | NC | NC | NC | NC | NC | NC | NC | NC | NC | NC |
| 72 hr | NC | NC | NC | NC | NC | NC | NC | NC | NC | NC |
| Mold contamination | 1 | 1 | 1 | 1 | 1 | 1 | 1 | 3 | 3 | 3 |

TABLE 9-continued

|  | Examples | | | | | | | Comparative Examples | | |
| --- | --- | --- | --- | --- | --- | --- | --- | --- | --- | --- |
|  | 17 | 18 | 19 | 20 | 21 | 22 | 23 | 5 | 6 | 7 |
| Hydrogenated copolymer | I | II | III | III | III | VI | V | VI | VII | VIII |
| Sour gasoline resistance *1 | | | | | | | | | | |
| 2nd cycle | NC | NC | NC | NC | NC | NC | NC | NC | NC | NC |
| 4th cycle | NC | NC | NC | NC | NC | NC | NC | NC | NC | NC |
| 8th cycle | NC | NC | NC | NC | NC | NC | NC | NC | NC | NC |

*1 NC: Crack formation was not observed

As seen from Table 9, a vulcanizable rubber composition comprising each of the highly saturated copolymer rubbers I to VI and a vinyl chloride resin exhibits a short scorch time ($T_5$) and an increased maximum torque ($V_{max}$). Thus the rubber composition has an excellent high-rate vulcanizability, and provides a vulcanizate having a high tensile stress at 100% elongation, a high strength, a high hardness and a reduced compression set. Thus the vulcanization efficiency is high.

Both weather resistance (i.e., ozone resistance) and sour gasoline resistance are at a high level. The heat aging resistance also is good and therefore the heat resistance is satisfactory. The above-mentioned highly saturated copolymer rubber, which was prepared by adopting the above-mentioned coagulation method, does not substantially contain halogens and therefore does not cause a problem of metal corrosion. Further, the rubber composition of the invention does not cause a problem of mold contamination.

Copolymers I to V were prepared by adding acrylonitrile or butadiene in lots during polymerization, and therefore, these copolymers exhibited a low $\Delta AN$, a small $T_{10}$ as measured by the Gehman tortional test and a reduced change in volume after immersion in an oil (Examples 17 to 23), as compared with copolymers VI to VIII prepared by charging the monomers at once before the commencement of polymerization (comparative Examples 5 to 7). Namely copolymers I to V have good and balanced oil resistance and cold resistance while keeping a high mechanical strength.

Further copolymers I to V were prepared by adding PMHT in lots during polymerization, and therefore, the highly saturated copolymer rubbers exhibited good and balanced processability and mechanical strength.

In contrast, composition of copolymers VI to VIII with a vinyl chloride resin (Comparative Examples 5 to 7), which were prepared by using a conventional and commercially available t-dodecyl mercaptan, exhibit a poor high-rate vulcanizability, a low mechanical strength and a large compression set.

EXAMPLE 24–28

Acrylonitrile-butadiene copolymer latexes, which were the same as those prepared in Examples 1 to 5 in the process for the preparation of copolymers I to VI, were prepared. The solid content in each of the copolymer latexes was adjusted to 1.2% by weight. 400 ml of each latex was introduced in an autoclave having an inner volume of 1 liter equipped with a Stirrer, and flushed with nitrogen gas for 10 minutes to remove oxygen dissolved therein. Palladium acetate as a hydrogenation catalyst, dissolved in 240 ml of acetone, was added into the autoclave. The inner atmosphere of the autoclave was substituted by hydrogen gas twice, and hydrogen gas was blown into the autoclave until the pressure reached 30 atm. Then the content was heated to 50° C. and stirred at that temperature for 6 hours to effect a reaction. The content was cooled to room temperature and the excessive hydrogen was purged. Then the latex was evaporated by an evaporator to remove the organic solvent and simultaneously concentrated to a solid content of 40% by weight. Thus aqueous emulsions of nitrile group-containing highly saturated copolymer rubbers were obtained, which copolymers were the same as copolymers I to V shown in Table 3. Average particle diameter, pH and solid content of the copolymer emulsions are shown in Table 11.

According to the recipe shown in Table 10, a liquid vulcanizable rubber composition was prepared from each aqueous emulsion of the above-prepared copolymers I to V. The liquid composition was spread on a glass sheet and dried for 3 days at a temperature of 20° C. and a humidity of 65%. The thus-obtained dried film was vulcanized at 100° C. for 30 minutes, and a specimen was blanked out from the film by using a JIS No. 3 dumbbell die. Tensile stress (kg/cm$^2$) at 300% elongation and elongation at break (kg/cm$^2$) were measured according to JIS K6301. The results are shown in Table 11.

COMPARATIVE EXAMPLES 8–10

By the same procedures as those described in Examples 24 to 28, aqueous emulsions of highly saturated copolymers VI to VIII (these copolymers were the same as highly saturated copolymers VI to VIII prepared in Comparative Examples 1 to 3) were prepared (properties of the copolymer emulsions are shown in Table 11), and further vulcanizates were made therefrom and evaluated. The results are shown in Table 11.

TABLE 10

|  | parts by weight |
| --- | --- |
| Aqueous emulsion | 100 |
| Colloidal sulfur | 1 |
| Zin oxide | 2 |
| Zinc diethylthiocarbamate | 1 |
| 2-Mercaptobenzothiazol zinc salt | 1 |

TABLE 11

| Hydrogenated copolymers | Example | | | | | Comp. Exam. | | |
|---|---|---|---|---|---|---|---|---|
| | 24 I | 25 II | 26 III | 27 IV | 28 V | 8 VI | 9 VII | 10 VIII |
| Average particle diameter (μm) | 0.10 | 0.11 | 0.11 | 0.10 | 0.10 | 0.09 | 0.10 | 0.11 |
| Solid content (%) | 40.1 | 40.0 | 40.2 | 40.1 | 40.1 | 40.0 | 40.1 | 40.0 |
| PH | 10.6 | 10.7 | 10.8 | 10.5 | 10.6 | 10.7 | 10.6 | 10.7 |
| Properties of vulcanizates | | | | | | | | |
| Tensile stress at 300% elongation (kgf/cm$^2$) | 32 | 28 | 33 | 35 | 32 | 27 | 25 | 24 |
| Tensile strength (kgf/cm$^2$) | 300 | 260 | 300 | 330 | 305 | 270 | 260 | 265 |

As seen from Table 11, vulcanized films made from the aqueous emulsions of the present invention exhibited high tensile stress at 300% elongation and tensile strength. In contrast, vulcanized films made with a conventional t-dodecyl mercaptan molecular weight modifier exhibited low tensile stress at 300% elongation and tensile strength.

EXAMPLES 29–34, COMPARATIVE EXAMPLES 11–13

According the recipe shown in Table 12, a nitrile group-containing highly saturated copolymer rubber and other ingredients were blended together on rolls to obtain rubber Sheet having a thickness of about 2.5 mm. Using each aqueous emulsion of highly saturated copolymer rubbers I to VIII used in Examples 24 to 29 and Comparative Examples 8 to 10, an adhesive composition was made according to the recipe shown in Table 13.

TABLE 12

| | parts by weight |
|---|---|
| Zetpol 2020 *1 | 100 |
| Zinc oxide #1 | 5 |
| Stearic acid | 1 |
| SRF carbon | 40 |
| Sulfur | 0.5 |
| Tetramethylthiuram disulfide | 1.5 |
| Mercaptobenzothiazole | 0.5 |

*1 Hydrogenated acrylonitrile-butadiene copolymer rubber having an iodine vale of 28 and a bound acrylonitrile content of 36%.

TABLE 13

| | |
|---|---|
| RF solution | |
| Resorcinol | 11.0 parts |
| Formalin (37%) | 16.2 |
| Aqueous sodium hydroxide (10%) | 3.0 |
| Water | 235.8 |
| Total | 266.0 |
| RFL solution | |
| Latex | 250.0 parts |
| RF solution | 266.0 |
| Aqueous ammonia (14%) | 22.6 |
| Water | 47.9 |
| Total | 586.5 |

Using each of the adhesive compositions, each of the following cords was subjected to a dipping treatment by a test single-cord dipping machine to prepare a treated cord. The cords used and the methods for the dipping treatment were as follows.

Nylon cords (6-nylon, 1,260 deniers/2) and rayon cords (3-super, 1,650 deniers/2) were treated with the RFL solution to obtain high-tensile cords.

Polyester fiber cords (polyethylene terephthalate, 1,500 deniers/3) were treated with a mixed solution composed of 600 parts of the RFL solution and 400 parts of a 2,6-bis-(2, 4-dihydroxyphenylmethyl-4-chlorophenol composition heat-treated at 245° C. for 1 minute, dipped in the RFL solution, and then heat-treated at 230° C. for 1 minute to obtain high-tensile cords.

Aramid fiber cords (Kevlar, 1,500 deniers/2, 127 T/m) were pre-treated with the following pre-treating liquid, heat-treated at 220° C., dipped in the RFL solution, and then heat-treated at 230° C. to obtain high-tensile cords.

| Composition of Pretreating Solution | (parts by weight) |
|---|---|
| Diglycidyl ether of glycerin | 2.22 |
| Aqueous sodium hydroxide (10%) | 0.28 |
| 5% "AEROSOL" OT (solid content 75%) *1 | 0.56 |
| Water | 96.94 |
| Total | 100.00 |

*supplied by Nippon Aerosil Co.

Glass fiber cords (ECG 150, 3/10, 20S) were dipped in an aqueous dispersion containing 5% of -aminopropyl-triethoxysilane, heat-treated at 150° C. for 3 minutes, dipped in the RFL solution and then heat-treated at 200° C. for 1 minute to obtain high-tensile cords.

Each treated cord was embedded in an adherend rubber composition at an embedded length of 8 mm, and a press-vulcanization was conducted at a press pressure of 5 MPa and a temperature of 150° C. for 30 minutes to obtain a fiber/rubber composite.

A cord-drawing test was conducted on the fiber/rubber composite according to ASTM D-2138-72 to determine the initial adhesion strength. Further, a cord-drawing test was conducted after the fiber/rubber composite was heat-treated at 120° C. for 168 hours in an air oven, to determine a hot-air aging adhesion strength. The results are shown in Table 14.

As seen from Table 14, a rubber/fiber composite comprised of the nitrile group-containing highly saturated copolymer rubber of the present invention and a fibrous material exhibits an enhanced adhesion strength as compared with a rubber/fiber composite comprising a conventional nitrile rubber-containing highly saturated copolymer rubber and a fibrous material.

TABLE 14

|  | Examples | | | | | Comparative Examples | | |
| --- | --- | --- | --- | --- | --- | --- | --- | --- |
|  | 24 | 25 | 26 | 27 | 28 | 8 | 9 | 10 |
| Hydrogenated copolymer in aqueous emulsion | I | II | III | IV | V | VI | VII | VIII |
| Iodine value/AN content | 15/34 | 5/44 | 15/44 | 30/44 | 15/50 | 15/34 | 15/44 | 15/50 |
| Fiber (initial adhesion after 120° C. × 168 hr heat-treatment/initial adhesion at room temperature) | | | | | | | | |
| Rayon | 19.0/19.5 | 19.5/19.5 | 19.5/20.0 | 19.5/20.0 | 19.0/20.0 | 17.0/19.0 | 17.0/17.5 | 17.0/17.0 |
| Nylon | 20.0/20.5 | 20.5/21.0 | 20.5/21.0 | 20.0/21.0 | 20.0/21.0 | 18.0/19.0 | 18.0/18.5 | 17.0/17.0 |
| Polyester fiber | 19.0/19.5 | 20.0/21.0 | 20.0/21.0 | 20.5/21.0 | 20.0/21.0 | 17.5/17.5 | 17.0/17.0 | 17.0/17.0 |
| Aramid fiber | 24.0/24.5 | 25.0/26.0 | 24.0/24.5 | 24.5/25.0 | 24.0/25.0 | 22.5/22.0 | 22.0/21.5 | 21.0/21.5 |
| Glass fiber | 20.0/20.5 | 21.0/22.0 | 20.0/20.5 | 20.5/21.0 | 21.0/21.5 | 18.0/18.5 | 17.5/18.0 | 17.0/17.5 |

The nitrile group-containing highly saturated copolymer rubber of the present invention has excellent high-rate vulcanizability, and a vulcanizate made therefrom exhibits good mechanical strength, compression set, oil resistance and cold resistance. Therefore, the nitrile groups containing highly saturated copolymer rubber can be used as raw material for various vibration insulators, electrical and electronic parts, automobile parts, industrial materials and parts, and footwears. For example, the highly saturated copolymer rubber is used for sealing materials such as an O-ring, a gasket, an oil seal and a Freon seal; belts such as an automobile V belt, a poly-rib belt and a toothed power transmitting belt; hoses such as an automobile fuel hose, as an automobile power steering hose, and high-pressure oil-resistant hoses such as oil pressure hoses for various machines, e.g., a construction machine; rolls; rubber articles for gas wells such as a packer, a blow-out preventor (BOP) and a pipe-protector; diaphragms; and an automobile clutch plate and an automobile brake shoe (these parts are made from a mixed material of the highly saturated rubber of the invention and a thermosetting resin such as a phenol resin or an epoxy resin).

Where the highly saturated copolymer rubber is made from an unsaturated nitrile-conjugated diene copolymer having an ethylenically unsaturated carboxylic acid monomer copolymerized therein, and a rubber composition is comprised of the highly saturated copolymer rubber and an oxide of a metal of group II of the periodic table, an vulcanizate of the rubber composition has excellent dynamic fatigue resistance, and therefore, is useful especially for articles which are repeatedly distorted when used, such as belts including a power transmitting belt.

The nitrile group-containing highly saturated copolymer rubber can be used as an aqueous emulsion. Both vulcanized film and unvulcanized film, which are made from the aqueous emulsion, have a high mechanical strength and good oil resistance and cold resistance, and therefore, they are used as binders for non-woven fabrics, impregnated paper, oil-resistant impregnated articles, foamed rubbery articles, shirring and cork. The aqueous emulsion is further used for an adhesive for bonding a reinforcing fibrous material such as polyamide fiber, polyester fiber or glass fiber, to a nitrile group-containing highly saturated rubber under vulcanization conditions.

What is claimed is:

1. A nitrile group-containing highly saturated copolymer rubber which is a product obtained by hydrogenating the conjugated diene portion of an unsaturated nitrile-conjugated diene copolymer; said highly saturated copolymer rubber having an alkylthio group having 12 to 16 carbon atoms, which include at least three tertiary carbon atoms, and having a sulfur atom which is directly bound to at least one of the tertiary carbon atoms; and said highly saturated copolymer rubber further having a Mooney viscosity of 15 to 200 and an iodine value not larger than 80.

2. A nitrile group-containing highly saturated copolymer rubber as claimed in claim 1, wherein said highly saturated copolymer rubber has at least 0.03 mole, per 100 moles of the monomeric units constituting the molecule, of said alkylthio group.

3. A nitrile group-containing highly saturated copolymer rubber as claimed in claim 1, wherein said highly saturated copolymer rubber has 0.07 to 0.3 mole, per 100 moles of the monomeric units constituting the molecule, of said alkylthio group.

4. A nitrile group-containing highly saturated copolymer rubber as claimed in claim 1, wherein said alkylthio group is at least one member selected from the group consisting of a 1,1-di(2,2-dimethylpropyl)-1-ethylthio group and a 1-(2,2-dimethylpropyl)-1-(2,2,4,4-tetramethylpentyl)-1-ethylthio group.

5. A nitrile group-containing highly saturated copolymer rubber as claimed in claim 1, wherein said alkylthio group is a 1,1-di(2,2-dimethylpropyl)-1-ethylthio group.

6. A nitrile group-containing highly saturated copolymer rubber as claimed in claim 1, wherein said highly saturated copolymer rubber contains 10 to 60% by weight, based on the weight of the copolymer rubber, of bound unsaturated nitrile units.

7. A nitrile group-containing highly saturated copolymer rubber as claimed in claim 1, wherein said unsaturated nitrile-conjugated diene copolymer is comprised of 10 to 60% by weight of acrylonitrile units, 90 to 40% by weight of butadiene units and 0 to 80% by weight of copolymerizable monomer units, and said nitrile group-containing highly saturated copolymer rubber has a Mooney viscosity of 20 to 90.

8. A nitrile group-containing highly saturated copolymer rubber as claimed in claim 1, wherein said unsaturated nitrile-conjugated diene copolymer contains 3 to 20% by weight of a fraction having a number average molecular weight (Mn) of not larger than 35,000.

9. A nitrile group-containing highly saturated copolymer rubber as claimed in claim 1, wherein the ratio (Mw/Mn) of the weight average molecular weight (Mw) to the number average molecular weight (Mn) of said unsaturated nitrile-conjugated diene copolymer is in the range of 2.3 to 5.5.

10. A nitrile group-containing highly saturated copolymer rubber as claimed in claim 1, wherein the breadth ($\Delta AN$) of compositional distribution of the unsaturated nitrile in said unsaturated nitrile-conjugated diene copolymer is not larger than 35.

11. A nitrile group-containing highly saturated copolymer rubber as claimed in claim 1, wherein the breadth (ΔAN) of compositional distribution of the unsaturated nitrile in said unsaturated nitrile-conjugated diene copolymer is in the range of 3 to 20.

12. A nitrile group-containing highly saturated copolymer rubber as claimed in claim 1, wherein said unsaturated nitrile-conjugated diene copolymer does not contain a halogen or contains smaller than 3 ppm of halogens.

13. A nitrile groups containing highly saturated copolymer rubber as claimed in claim 1, wherein said unsaturated nitrile-conjugated diene copolymer comprises 1 to 80% by weight, based on the weight of the unsaturated nitrile-conjugated diene copolymer, of units of an unsaturated carboxylic acid ester or a combination of an unsaturated carboxylic acid ester with a fluorine-containing vinyl monomer.

14. A process for producing a nitrile group-containing highly saturated copolymer rubber according to claim 1, which comprises the steps of:

copolymerizing an unsaturated nitrile, a conjugated diene and an optional copolymerizable monomer in the presence of a free radical initiator by using as a molecular weight modifier an alkylthiol compound having 12 to 16 carbon atoms. Which include at least three tertiary carbon atoms, and having a sulfur atom which is directly bound to at least one of the tertiary carbon atoms; and then hydrogenating the thus-obtained unsaturated nitrile-conjugated diene copolymer.

15. A process for producing a nitrile group-containing highly saturated copolymer rubber as claimed in claim 14, wherein said alkylthiol compound is at least one compound selected from the group consisting of 2,2',4,6,6'-pentamethylheptane-4-thiol and 2',4,6,6',8,8'-heptamethylnonane-4-thiol.

16. A process for producing a nitrile group-containing highly saturated copolymer rubber as claimed in claim 14, wherein the amounts of the unsaturated nitrile, the conjugated diene and the optional copolymerizable monomer are, based on the total weight of the monomers, 10 to 60% by weight, 40 to 90% by weight and 0 to 80% by weight, respectively; and the amount of the alkylthiol compound is 0.05 to 3 parts by weight based on 100 parts by weight of the total monomers.

17. A process for producing a nitrile group-containing highly saturated copolymer rubber as claimed in claim 14, wherein said copolymerization is effected by an emulsion copolymerization procedure using a carboxylic type emulsifier.

18. A process for producing a nitrile group-containing highly saturated copolymer rubber as claimed in claim 14, wherein said copolymerization is commenced by using 30 to 90% by weight of the total amount of the monomers, and, when the polymerization conversion reaches a value of 20 to 70%, the remainder of the monomer amount is added to the polymerization mixture.

19. A process for producing a nitrile group-containing highly saturated copolymer rubber as claimed in claim 14, wherein 10 to 95% by weight of the total amount of the alkylthiol compound is incorporated in a starting monomer mixture before the commencement of polymerization and, when the polymerization conversion reaches a value of 20 to 70%, the remainder of the alkylthiol compound is added to the polymerization mixture.

20. A process for producing a nitrile group-containing highly saturated copolymer rubber as claimed in claim 14, wherein said copolymerization is effected by an emulsion polymerization procedure to obtain a latex of the unsaturated nitrile-conjugated diene copolymer, a nonionic surface active agent is added to the copolymer latex, the latex is then introduced in a coagulating bath having a metal Salt dissolved therein and substantially not containing halogens; the latex-introduced coagulating bath is heated thereby the copolymer latex is coagulated, followed by hydrogenation of the thus-obtained unsaturated nitrile-conjugated diene copolymer.

21. A process for producing a nitrile groups-containing highly saturated copolymer rubber as claimed in claim 20, wherein said nonionic surface active agent is an alkylene oxide adduct of an alkylphenol-formaldehyde condensate, said adduct having a cloud point of 10° to 100° C.

22. A process for producing a nitrile group-containing highly saturated copolymer rubber as claimed in claim 21, wherein said alkylene oxide adduct is an oxyethylene-oxypropylene co-addition product.

23. A process for producing a nitrile group-containing highly saturated copolymer rubber as claimed in claim 20, wherein said metal salt is selected from the group consisting of aluminum sulfate, magnesium sulfate and aluminum sulfate.

24. A vulcanizable rubber composition comprising 100 parts by weight of a nitrile group-containing highly saturated copolymer rubber and 0.01 to 10% by weight of a sulfur-containing vulcanizer; said nitrile group-containing highly saturated copolymer rubber is a product obtained by hydrogenating the conjugated diene portion of an unsaturated nitrile-conjugated diene copolymer; said highly saturated copolymer rubber having an alkylthio group having 12 to 16 carbon atoms, which include at least three tertiary carbon atoms, and having a sulfur atom which is directly bound to at least one of the tertiary carbon atoms; and said highly saturated copolymer rubber further having a Mooney viscosity of 15 to 200 and an iodine value not larger than 80.

25. A vulcanizable rubber composition as claimed in claim 24, wherein said unsaturated nitrile-conjugated diene copolymer used for the preparation of the nitrile group-containing highly saturated copolymer rubber contains 0.1 to 15% by weight, based on the weight of the copolymer, of ethylenically unsaturated carboxylic acid monomer units; and said vulcanizable rubber composition further comprising 0.5 to 30 parts by weight, per 100 parts by weight of the rubber composition, of an oxide of a metal of group II of the periodic table.

26. A vulcanizable rubber composition as claimed in claim 24, wherein said rubber composition further comprises 5 to 50 parts by weight of a vinyl chloride resin per 100 parts by weight of the sum of the nitrile group-containing highly saturated copolymer rubber and the vinyl chloride resin.

27. An injection-molded article made from the vulcanizable rubber composition as claimed in claim 24.

28. An O-ring made from the vulcanizable rubber composition as claimed in claim 24.

29. An aqueous emulsion containing 5 to 80% by weight, based on the weight of the emulsion, of a nitrile group-containing highly saturated copolymer rubber in the form of finely divided particles having a particle diameter of 0.005 to 0.5 µm; said nitrile group-containing highly saturated copolymer rubber being a product obtained by hydrogenating the conjugated diene portion of an unsaturated nitrile-conjugated diene copolymer; said highly saturated copolymer rubber having an alkylthio group having 12 to 16 carbon atoms, which include at least three tertiary carbon atoms, and having a sulfur atom which is directly bound to at least one of the tertiary carbon atoms; and said highly saturated copolymer rubber further having a Mooney viscosity of 15 to 200 and an iodine value not larger than 80.

30. An aqueous emulsion as claimed in claim 29, which is prepared by hydrogenating directly a latex of the unsaturated nitrile-conjugated diene copolymer as-obtained by an emulsion polymerization procedure.

31. An aqueous emulsion as claimed in claim 29, which is prepared by the phase reversal of emulsion from (i) a solution of said nitrile group-containing highly saturated copolymer rubber and (ii) an aqueous solution of an emulsifier.

32. An adhesive composition comprising (i) an aqueous emulsion of the nitrile group-containing highly saturated copolymer rubber as claimed in claim 29, and (ii) a resorcinol-formaldehyde resin.

33. An adhesive composition as claimed in claim 32, wherein the amount of the resorcinol-formaldehyde resin is in the range of 10 to 180 parts by weight per 100 parts by weight of the solid content in the aqueous emulsion of the copolymer rubber.

* * * * *